US007969845B2

(12) United States Patent
Kitani et al.

(10) Patent No.: US 7,969,845 B2
(45) Date of Patent: Jun. 28, 2011

(54) OPTICAL RECORDING APPARATUS, RECORDING METHOD FOR OPTICAL RECORDING MEDIUM AND OPTICAL RECORDING MEDIUM

(75) Inventors: Satoshi Kitani, Tokyo (JP); Hideho Maeda, Tokyo (JP); Takashi Sasaki, Kanagawa (JP)

(73) Assignee: Sony Corporation (JP)

( * ) Notice: Subject to any disclaimer, the term of this patent is extended or adjusted under 35 U.S.C. 154(b) by 856 days.

(21) Appl. No.: 11/818,524

(22) Filed: Jun. 13, 2007

(65) Prior Publication Data

US 2008/0043597 A1 Feb. 21, 2008

(30) Foreign Application Priority Data

Jun. 14, 2006 (JP) ................................ P2006-164808

(51) Int. Cl.
*G11B 7/00* (2006.01)
(52) U.S. Cl. .................. 369/53.21; 369/116; 369/59.25
(58) Field of Classification Search .......................... None
See application file for complete search history.

(56) References Cited

U.S. PATENT DOCUMENTS

| 6,266,299 | B1 * | 7/2001 | Oshima et al. | 369/13.38 |
| 7,376,070 | B2 * | 5/2008 | Sakaue et al. | 369/275.3 |
| 2005/0013217 | A1 * | 1/2005 | Kuroda | 369/47.14 |

FOREIGN PATENT DOCUMENTS

| JP | 07-235130 A | 9/1995 |
| JP | 8-241564 | 9/1996 |
| JP | 10-162371 | 6/1998 |
| JP | 11-306546 | 11/1999 |
| JP | 3144408 B2 | 3/2001 |
| WO | WO-2005/050638 A1 | 6/2005 |

* cited by examiner

*Primary Examiner* — Joseph Haley
(74) *Attorney, Agent, or Firm* — Lerner, David, Littenberg, Krumholz & Mentlik, LLP

(57) ABSTRACT

Disclosed herein is an optical recording apparatus which may record post pre-format recording information on an optical recording medium which has a guide portion formed in advance for guiding a light beam and a plurality of address portions for specifying individual positions of the guide portion, which may include position information detection means for detecting position information of a recording region in which significant information is recorded along the guide portion and a breakdown region which is part of the guide portion or/and the address portions and is broken down so as not to be detected using the light beam, servo means for controlling the position of the light beam based on the position information, and laser light intensity adjustment means for adjusting the intensity of the light beam in order to record information based on a predetermined format in the recording region and thermally break down the breakdown region.

11 Claims, 9 Drawing Sheets

ADDRESS PULSE BASED ON INNER
CIRCUMFERENCE SIDE ADDRESS PIT

ADDRESS PULSE BASED ON OUTER
CIRCUMFERENCE SIDE ADDRESS PIT

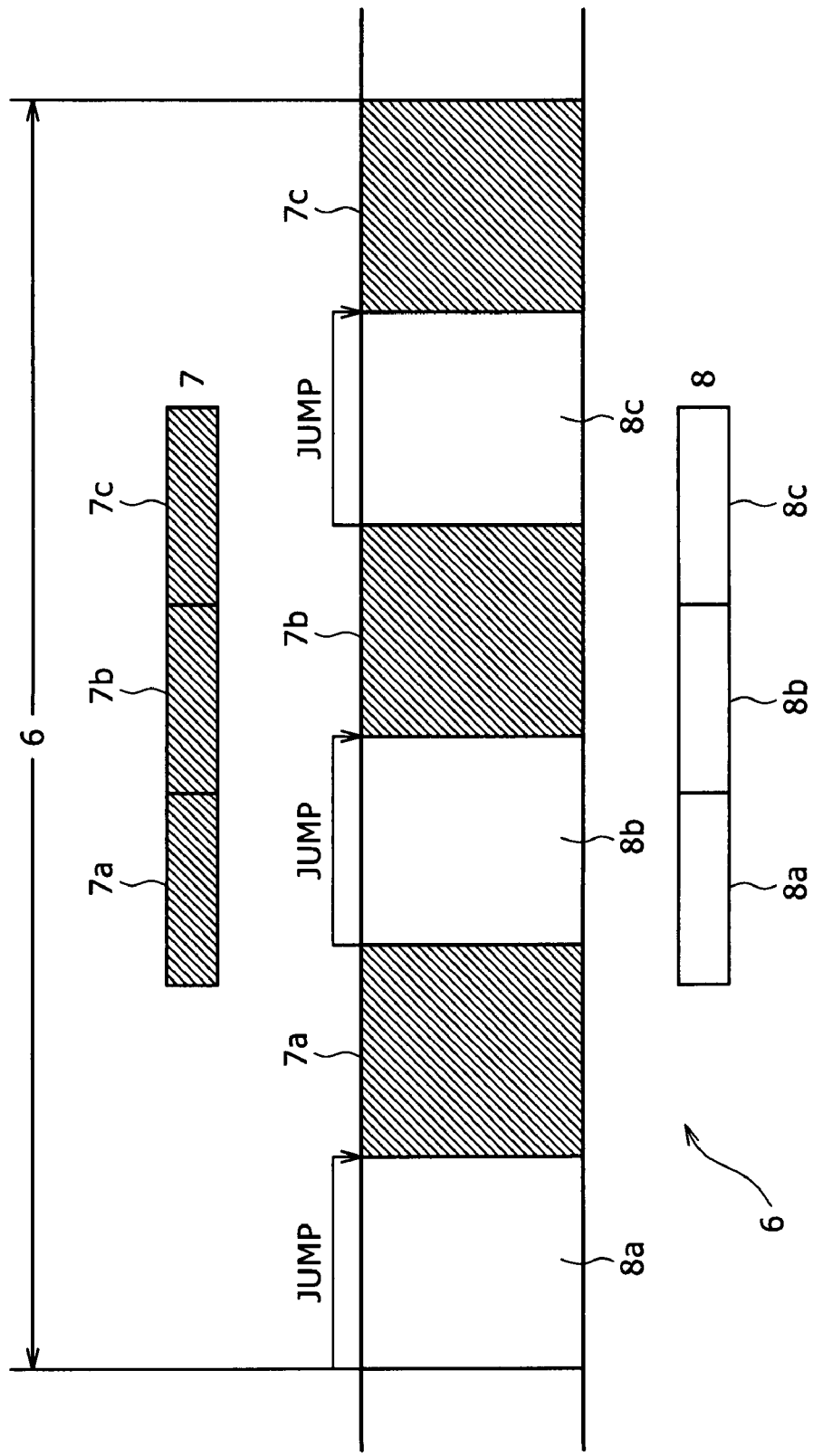

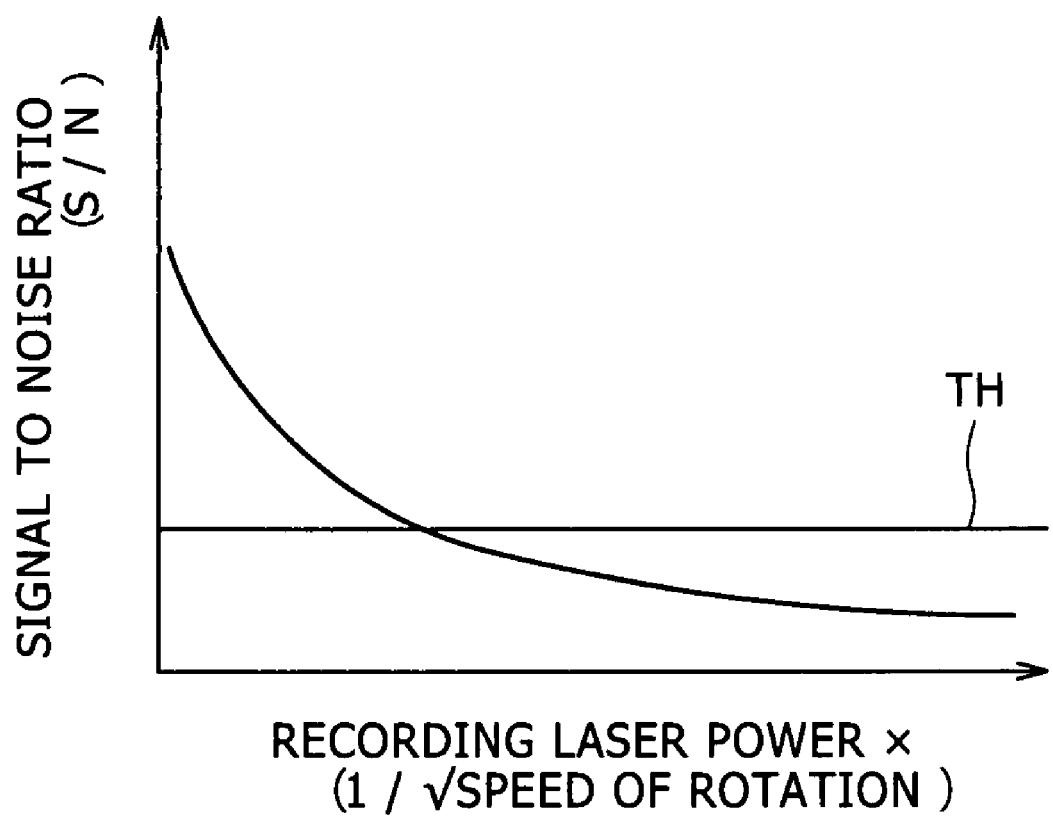

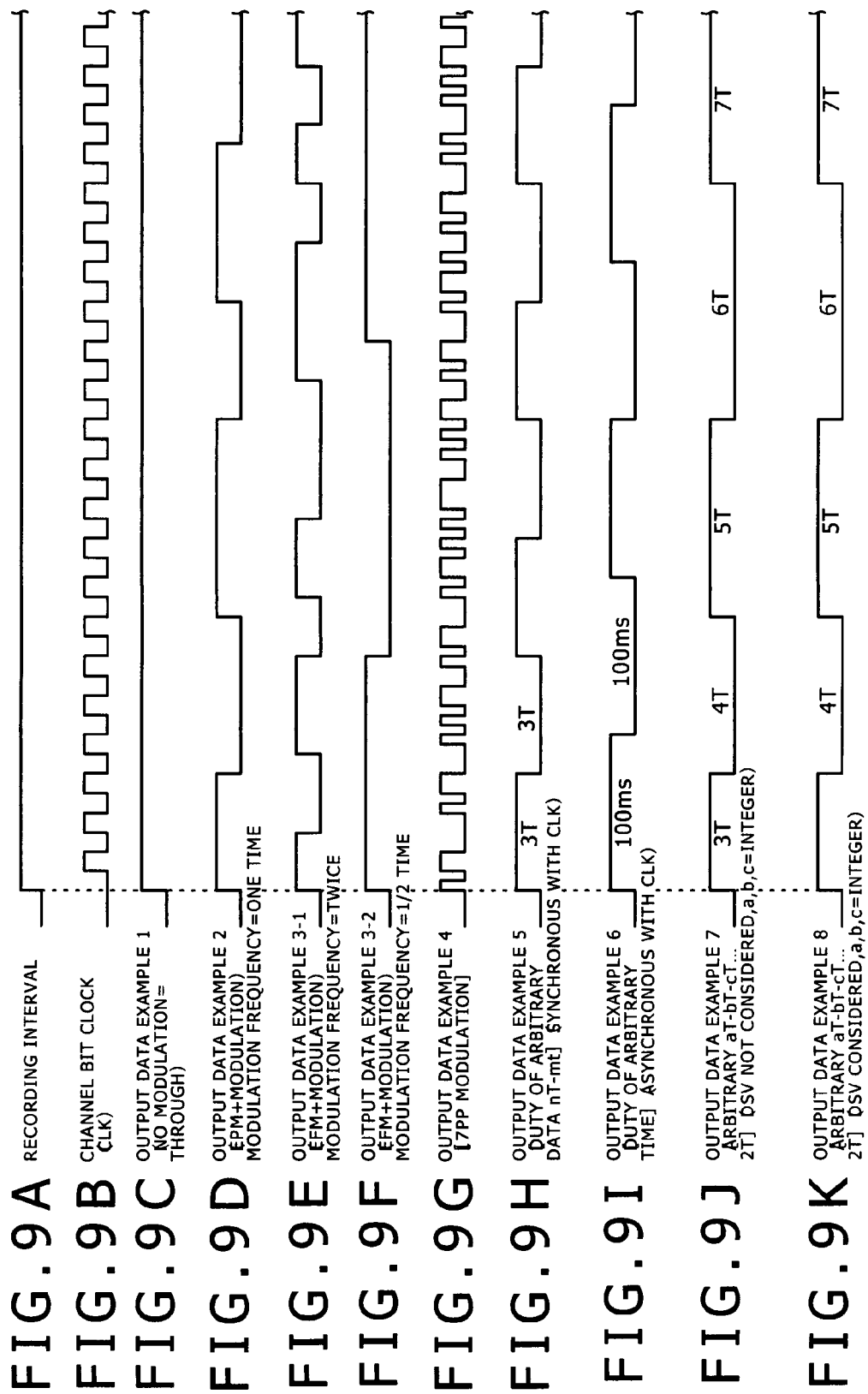

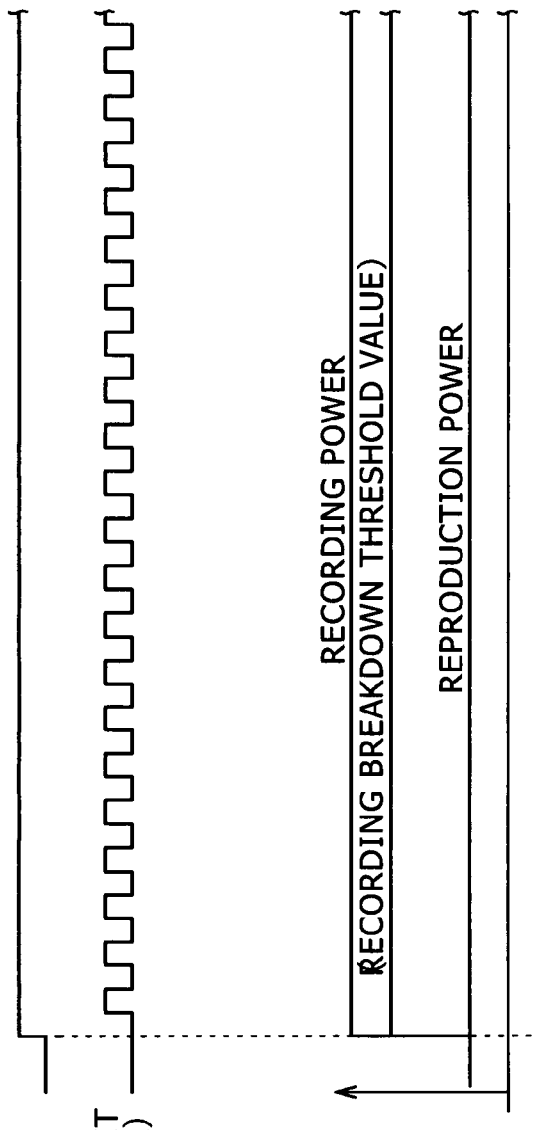

OPTICAL RECORDING APPARATUS, RECORDING METHOD FOR OPTICAL RECORDING MEDIUM AND OPTICAL RECORDING MEDIUM

CROSS-REFERENCE TO RELATED APPLICATIONS

This application claims priority from Japanese Patent Application No. JP 2006-164808 filed in the Japanese Patent Office on Jun. 14, 2006, the entire content of which is incorporated herein by reference.

BACKGROUND OF THE INVENTION

1. Field of the Invention

This invention relates to an optical recording apparatus, an optical recording method for an optical recording medium, and an optical recording medium.

2. Description of the Related Art

In recent years, it has been popularized to digitally record a content of audio data, video data or like data on an optical recording medium such as a DVD-ROM (Digital Versatile Disc Read Only Memory) and distribute the optical recording medium. Thus, an optical recording medium reproduction apparatus having a function of reproducing information recorded on such an optical recording medium as mentioned above such as a DVD reproduction apparatus is provided as a consumer appliance for exclusive use. Further, that, if DeCSS software and software for copying are installed into a DVD reproduction apparatus incorporated in an ordinary PC and the DVD reproduction apparatus is controlled by a CPU (Central Processing Unit) to cancel the CSS applied to a DVD-ROM to place the DVD-ROM into a DVD-ROM of plaintext, whose digital data (sector data) can be copied as it is for each sector on a digital recording medium such as an optical recording medium, a tape or a hard disk. A copy of sector data from such a DVD-ROM or such a DVD recording medium as hereinafter described as it is hereinafter referred to as DVD copy.

Meanwhile, an optical recording medium for implementing the object of storage and distribution of contents or software is provided not only in the form of an optical recording medium for reproduction only like a DVD-ROM described hereinabove but also in other various forms like write-once ready many or rewritable optical recording media. For example, an optical recording medium is provided in the form of a DVD-R, a DVD-RW or a DVD-RAM which are optical recording media standardized by the DVD Forum which is an international organization which conducts publicity activities for establishment of standards for and popularization of the DVD. Or, an optical recording medium is provided in the form of a DVD+R or a DVD+RW which are standardized by the DVD+RW Alliance which promotes development and popularization of a rewritable DVD format which has wide compatibility. Such DVDs as mentioned above are hereafter referred to collectively as DVD recording media. Such DVD recording media are preformatted such that information of a content, software or the like (such information is hereinafter referred to as post pre-format recording information) is recorded on the DVD recording media utilizing the pre-format information. Further, DVD recording apparatus as optical recording apparatus for recording information on such DVD recording media and DVD recording and reproduction apparatus as optical medium recording and reproduction apparatus having both of recording and reproduction functions are popularized as storage devices for consumer appliances and PCs in recent years. Using such apparatus, a general user can duplicate digital information readily.

Since post pre-format recording information recorded on such a DVD recording medium as described above can be read by a DVD reproduction apparatus or a DVD recording and reproduction apparatus, as popularization of the DVD recording and reproduction apparatus proceeds, such various DVD recording media as mentioned above have come to be generally used for the distribution of a comparatively small number of distribution destinations although they are not distributed to such a great number of distribution destinations as that of DVD-ROMs.

Thus, a problem has occurred in regard to how to prevent DVD copying similarly to DVD-ROMs. However, an effective countermeasure for preventing DVD copying different from the countermeasure described above for prevention of duplication of DVD-ROMs has been proposed from a point of view unique to DVD recording medium. The effective countermeasure mentioned is disclosed, for example, in the pamphlet of International Publication No. WO 2005/050638 (hereinafter referred to as Patent Document 1).

In Patent Document 1, it is proposed to record a signal on a DVD recording medium intentionally changing the signal format of the signal from that provided by the standards (DVD standards) prescribed in order to assure the compatibility as described in (1) to (6) below to make it difficult to use a PC to read out the signal from the DVD recording medium thereby to compulsorily stop DVD copying: (1) coding in a rule other than EFM+ (Eight to Fourteen Modulation plus); (2) alteration of the format of the ECC (Error Correction Code); (3) alteration of the format of the ID (Identification Data); (4) alteration of the IED (ID Error Correction) code; (5) alteration of the format of the CPR_MAI (Copyright Management Information); and (6) alternation of the format of the EDC (Error Detection Code).

The DVD copying prevention function disclosed in Patent Document 1 relies upon the following principle. In particular, in an ordinary reproduction operation wherein a signal is read out from a DVD recording medium, data are accessed non-linearly to reproduce at least one linked content in an interactive fashion. Upon such an ordinary reproduction operation, even if one of the processes (1) to (6) described above is applied so as to make it difficult to read information of some sectors, the reproduction function can be assured. On the other hand, where information from a DVD recording medium is copied on a DVD, data is accessed linearly. In particular, a DVD reproduction apparatus or a DVD recording and reproduction apparatus provided in a PC in which software for data copying of a DVD recording medium is installed reads data (sector data) for each sector and duplicates the sector data one by one to another medium. Therefore, where a DVD recording medium includes sector data to which any of the processes (1) to (6) described above is applied, the data reproduction function is stopped, and consequently, DVD copying may not be performed.

The DVD copying prevention function based on the principle described above acts effectively in a PC which includes a DVD reproduction apparatus which is used exclusively for data reproduction. However, the DVD copying prevention function does not sometimes act in another PC which includes a DVD recording and reproduction apparatus which has a function of recording information on a DVD recording medium. in order to achieve the object of storage and distribution of software in addition of contents mentioned hereinabove, a DVD reproduction apparatus is provided as a storage device for a personal computer (PC).

The amount of information supplied from such an optical recording medium as described above is as great as, for example, where the optical recording medium is a DVD-ROM, 4.7 GB (gigabytes) in the maximum with one face of the disk. Therefore, if information can be copied readily from an optical recording medium, then the interests of the copyright holder are impaired significantly. From such a point of view, in order to prevent duplication of an output after converted into an analog signal, for example, for a DVD-ROM, a CPS (Content Protection System) and a CGMS (Copy Generation Management System) are used.

Further, taking it into consideration that duplication of information in the form of digital data through use of a PC inflicts a more serious loss on the copyright holder than duplication of information at a stage after conversion into analog data, a countermeasure for prevention of digital duplication is taken in recent years in order to prevent copy of information in the form of digital data. For example, for the DVD-ROM, a CSS (Content Scrambling System) is used. However, the function of the CSS is disabled readily by DeCSS software. In particular, it is the existing situation In particular, a DVD recording and reproduction apparatus in principle performs a reproduction operation relying upon post pre-format recording information recorded later on a preformatted DVD recording medium. However, a DVD recording and reproduction apparatus has a function of reading, when it may not detect post pre-format recording signal, information from a DVD recording medium (such information is hereinafter referred to as pre-format information) preformatted on the DVD recording medium. Therefore, even if the DVD recording and reproduction apparatus detects some format violation in information of post pre-format recording information to which any of the processes (1) to (6) described hereinabove is applied, for example, information of the ID of the post-format recording information, also it is possible for the DVD recording and reproduction apparatus to read, for example, from wobbles, address information formed as prepits along the wobbles and use the read address information to continue the reproduction. As a result, even if some information may not be read by any of the processes (1) to (6), there is the possibility that the reproduction operation may continue without being stopped thereby to allow data copying to be performed continuously.

It is to be noted that, while the foregoing description is given taking a DVD recording medium as an example, usually this problem occurs similarly also where post pre-format recording information is recorded on an optical recording medium having pre-format information similar to that of a DVD recording medium and the optical recording medium which can be reproduced based on the post pre-format recording information is reproduced using an optical recording and reproduction apparatus to copy sector data as it is.

Meanwhile, Japanese Patent Laid-Open No. Hei 7-235130 (hereinafter referred to as Patent Document 2) discloses a technique relating to logical breakdown by which data which does not appear from a recording system on a recording medium is recorded or physical breakdown of a recording layer. Where a medium on which digital data from a medium having such data as described above is duplicated illegally one by one is used, the logically or physically broken down portion does not generate an error. Therefore, according to the technique of Patent Document 2, a reproduction operation is stopped based on the fact that no such an error as described above occurs.

On the other hand, Japanese Patent No. 3,144,408 (hereinafter referred to as Patent Document 3) discloses another technique relating to duplication prevention of a succeeding program where a preceding program read out precedently exists and then the succeeding program is read out under the environment of execution of the preceding program. In other words, according to the technique of Patent Document 3, a portion which may not be detected by an ordinary computer is provided at part of the succeeding program, and an algorithm for executing the succeeding program bypassing the portion described is provided in the preceding program. Thus, while normal operation with a genuine medium is guaranteed, illegal duplication and execution is prevented.

SUMMARY OF THE INVENTION

Thus, it is demanded to provide an optical recording apparatus, a recording method for an optical recording medium by which one-to-one copying of digital data from an optical recording medium which has pre-format information and on which post pre-format recording information is recorded such that reproduction of the optical recording medium is permitted based on the pre-format information or post pre-format recording information is prevented.

Also it is demanded to provide an optical recording medium which includes a countermeasure for preventing copying of data recorded thereon.

According to an embodiment of the present invention, there is provided an optical recording apparatus which may record post pre-format recording information on an optical recording medium which may have a guide portion formed in advance for guiding a light beam and a plurality of address portions for specifying individual positions of the guide portion, including a position information detection section configured to detect position information of a recording region in which significant information is recorded along the guide portion and a breakdown region which is part of the guide portion or/and the address portions and is broken down so as not to be detected using the light beam, a servo section configured to control the position of the light beam based on the position information, and a laser light intensity adjustment section configured to adjust the intensity of the light beam in order to record information based on a predetermined format in the recording region and thermally break down the breakdown region.

The optical recording apparatus may be configured so as to record post pre-format recording information on an optical recording medium which has a guide portion formed in advance for guiding a light beam and a plurality of address portions for specifying individual positions of the guide portion and may include a position information detection section, a servo section, and a laser light intensity adjustment section. The position information detection section may detect position information of a recording region in which significant information is recorded along the guide portion and a breakdown region which is part of the guide portion or/and the address portions and is broken down so as not to be detected using the light beam. The servo section may control the position of the light beam based on the position information. The laser light intensity adjustment section may adjust the intensity of the light beam in order to record information based on a predetermined format in the recording region and thermally break down the breakdown region. Since the optical recording apparatus thermally may break down part of the optical recording medium in this manner, information may not be reproduced from the thermally broken down region.

In order to solve such a subject as just described, according to another embodiment of the present invention, there is provided an optical recording method for an optical recording medium which may have a guide portion formed in advance for guiding a light beam and a plurality of address portions for specifying individual positions of the guide portion, which may include detecting position information of a recording region in which significant information is recorded along the guide portion and a breakdown region which is part of the guide portion or/and the address portions and is broken down so as not to be detected using the light beam, controlling the position of the light beam based on the position information, emitting the light beam having an optical intensity with which information based on a predetermined format can be recorded in the recording region, and emitting the light beam having an optical intensity with which the breakdown region can be thermally broken down.

The optical recording method may be configured as an optical recording method for an optical recording medium which may have a guide portion formed in advance for guiding a light beam and a plurality of address portions for specifying individual positions of the guide portion, and may include the following steps. First, position information of a recording region in which significant information is recorded along the guide portion and a breakdown region which is part of the guide portion or/and the address portions and is broken down so as not to be detected using the light beam is detected. Then, the position of the light beam is controlled based on the position information. Further, the light beam having an optical intensity with which information based on a predetermined format can be recorded in the recording region is emitted. Further, the light beam having an optical intensity with which the breakdown region can be thermally broken down is emitted. Since a thermally broken down region may be formed on the optical recording medium in this manner, information may not be reproduced from the thermally broken down region.

In order to solve such a subject as just described, according to a further embodiment of the present invention, there is provided an optical recording medium which may have a guide portion formed in advance for guiding a light beam and a plurality of address portions for specifying individual positions of the guide portion, including a region in which the guide portion for guiding the light beam for recording significant information and a plurality of address portions for specifying individual positions of the guide portion are disposed, and another region in which any of the guide portion or/and the address portions is lost.

The optical recording medium may be configured as an optical recording medium which has a guide portion formed in advance for guiding a light beam and a plurality of address portions for specifying individual positions of the guide portion and can guide the light beam along the guide portion and allow detection of address information of the positions of the guide portion from the address portions. Therefore, significant information recorded at the positions can be reproduced. On the other hand, information may not be reproduced from a region in which one or both of the guide portion and the address portion are broken down.

Thus, with the recording method for an optical recording medium, one-to-one copying of digital data from the optical recording medium which allows reproduction based on pre-format information or post pre-format recording information may be prevented. With the optical recording apparatus, information for preventing such copying can be recorded on an optical recording medium. The optical recording medium thus prevents such copying therefrom.

BRIEF DESCRIPTION OF THE DRAWINGS

FIG. 7 is a diagrammatic view illustrating a structure of an interleave block;

FIG. 8 is a diagram illustrating a relationship between the signal to noise ratio (S/N) and heat with which a light beam is generated upon detection of an address pit;

FIGS. 9A to 9K are waveform diagrams illustrating several examples of post pre-format recording information from a control section of the DVD-R recording apparatus; and FIGS. 10A to 10D are waveform diagrams illustrating a relationship between the post pre-format recording information and the laser output power.

DETAILED DESCRIPTION

Figure 1:
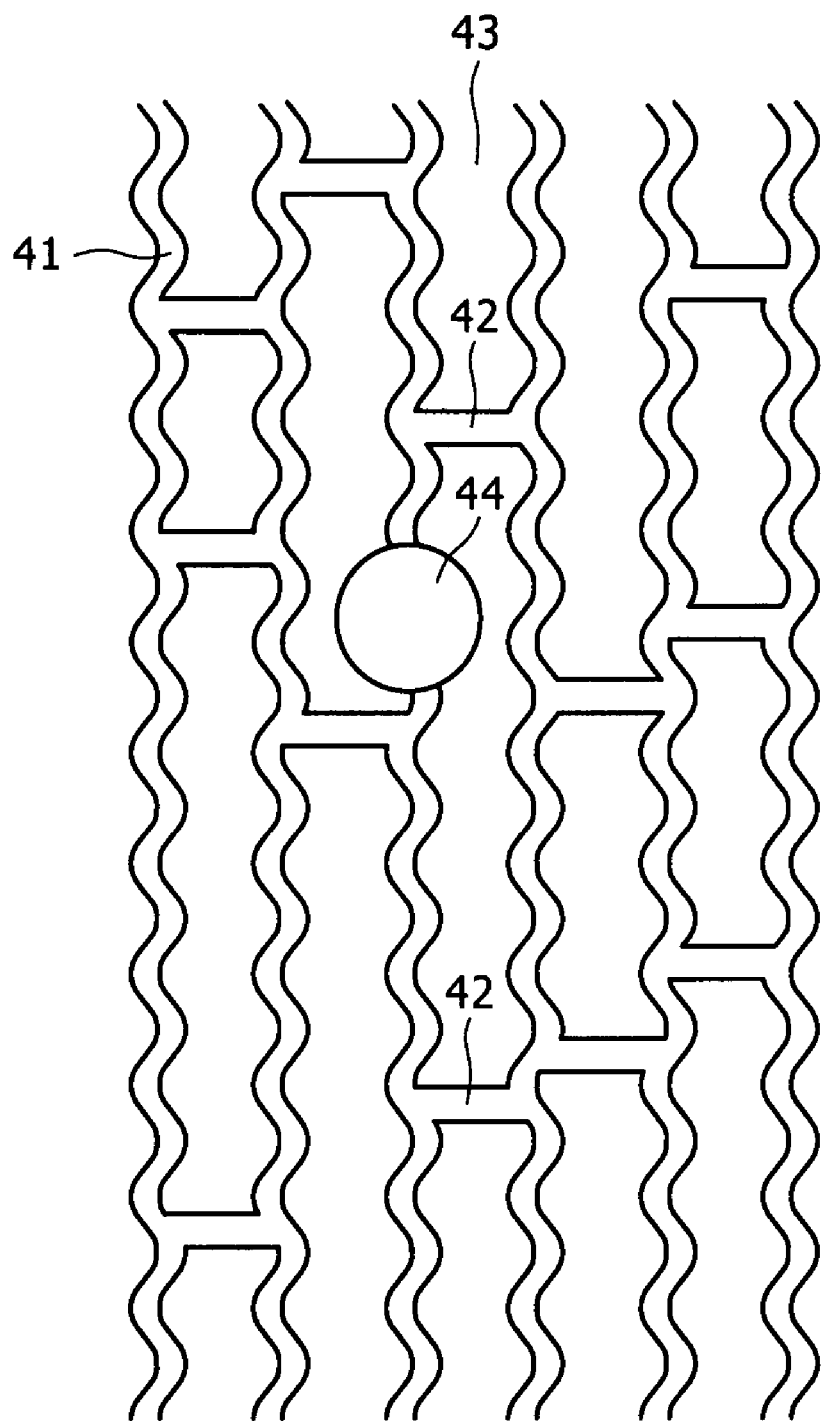
FIG. 1 is a schematic view illustrating a pre-format of a DVD-R recording medium.

An optical recording apparatus to which the present invention is applied is an apparatus which records information on an optical recording medium and particularly records post pre-format recording information on an optical recording medium which has a guide portion formed in advance (pre-formatted) for guiding a light beam and a plurality of address portions for specifying individual positions of the guide portion. More particularly, the optical recording apparatus has a function of recording significant information, which is information reproducible based on a predetermined format, along the guide portion and breaking down at least part of one or both of the guide portion and the address portions to form a broken down region. The guide portion may be a continuous groove or discretely disposed pits. Meanwhile, the guide portions for specifying the positions of the guide portion may each have a changed shape portion representative of a predetermined position of the guide portion on the guide portion. Or, the guide portion itself may be changed in shape such that the guide portion and the address portions are used commonly.

The significant information signifies information which is originally scheduled to be recorded on the optical recording medium and is of utility value in accordance with a format and which can be reproduced by an optical reproduction apparatus which reproduces information from the optical recording medium. For example, in the case of the DVD-R which is hereinafter described in connection with several embodiments, the significant information is information in accordance with the DVD-R format for a medium for recording the DVD-R. In such an instance, the significant information can be reproduced using an integrated circuit (LSI) compatible therewith.

The breakdown of part of the guide portion or/and the address portions is achieved by raising the temperature in a region in which laser light is irradiated to physically and thermally break down at least the guide portion or the address portions of the optical recording medium. To this end, the optical recording medium includes a position information detection section configured to detect position information of a recording region in which post pre-format recording information is recorded and the breakdown regions in order to specify the positions of the regions as predetermined positions on the optical recording medium. The position detection section includes, as a principal component thereof, an address information detection circuit configured to detect address information written in the address portions.

The optical recording apparatus further includes a servo section configured to control the position of the light beam based on the position information. The servo section includes a computing unit configured to detect a focusing error signal, a tracking error signal, a slide feed motor control signal and a spindle motor control signal and perform phase compensation and arithmetic operation such as integration of a gain constant. The servo section further includes actuators including a focusing actuator, a tracking actuator, a slide feed motor and a spindle motor to which signals obtained by the arithmetic operation are supplied. The servo section operates organically to control the position of the light beam on the optical recording medium based on the position information.

The optical recoding apparatus further includes a laser light intensity adjustment section configured to adjust the intensity of the light beam. The laser light intensity adjustment section includes a laser light source, a setting circuit for current to be applied to the laser light source, and a circuit configured to control the current in regard to whether or not the current should be applied to the laser light source. The laser light intensity adjustment section adjusts the intensity of the light beam so as to record information based on the predetermined format in the recording region but thermally break down the breakdown region.

As a method of thermally breaking down only the breakdown region, the intensity of the laser light from the laser light source may be raised to raise the temperature so as to break down the guide portion or the address portions. Or, while the intensity of the laser light is not raised, the relative speed between the optical recording medium and the light beam may be lowered so as to give rise to a temperature rise to break down the guide portion or the address portions. Or else, the intensity of the laser light may be raised while the relative speed between the optical recording medium and the light beam is lowered to cause thermal breakdown.

Where post pre-format recording information (information which is not significant post pre-format recording information) different from post pre-format recording information of the predetermined format is recorded or no post pre-format recording information is recorded in the region in which the pre-format information in any of the guide portion and the address portions is broken down in this manner, the post pre-format recording information may not be read out and besides the pre-format information may not be read out either.

When the pre-format information in any of the guide portion and the address portions is to be broken down, only a desired region can be broken down by performing the breakdown to such a degree that the light beam can be guided along the guide portion similarly as upon ordinary recording and reproduction. Also it is possible to break down the guide portion or the address portions over a wider range using the light beam so that a servo signal may not be obtained from a signal from the broken down address portion or guide portion. In this instance, servo information for maintaining operation of the servo systems for focusing servoing, tracking servoing, slide feed servoing and spindle servoing may not be obtained from the guide portion any more by an effect of the breakdown. Therefore, the guide portion can be broken down over a long interval by a recording apparatus which includes means for producing signals for servoing necessary for specifying only those portions which are to be broken down without breaking down information in any region which should not be broken down relying upon information from the guide portion other than the broken down portion of the guide portion to maintain operation of the servo systems for focusing servoing, tracking servoing, slide feed servoing and spindle servoing.

Further, in a case wherein, for example, a groove which functions as the guide portion is broken down over such a long interval that the light beam may not trace the groove by an action of the tracking servoing, since the tracking servoing does not act appropriately irrespective of the post pre-format recording information in the broken down region, information may not be reproduced from the region. Accordingly, also such breakdown of the groove over a long interval can be used as a countermeasure for prevention of DVD copying.

By providing such a broken down pre-format region or by recording information which is not significant post pre-format recording information in addition to provision of such a broken down pre-format region, prevention of DVD copying of post pre-format recording information by means of a PC in which software having a one-to-one digital data copying function is installed can be achieved. However, this does not make an obstacle to reproduction because the post pre-format recording information can be read out bypassing the regions in which the pre-format information is broken down if an apparatus for exclusive use having a function of reading out information from an optical recording medium which is partly broken down in this manner is used.

The breakdown of any of the guide portion and the address portions may be performed after the post pre-format recording information is recorded on the optical recording medium, or any of the guide portion and the address portions may include a portion in which the pre-format information is broken down from the first so that it may not have a function as a guide portion or an address portion. Where any of the guide portion and the address portions is broken down after the post pre-format recording information is recorded on the optical recording medium, the optical recording apparatus itself may record the post pre-format recording information while it breaks down the pre-format information. Or, the post pre-format recording information may be written into a requisite predetermined region, whereafter the pre-format information is broken down partly. On the other hand, where the pre-format portion includes a portion broken down from the first so that it may not have a function as a guide portion or an address portion, an optical recording medium wherein pre-format information is partly broken down in advance may be provided whereas the recording apparatus itself does not break down the pre-format information. Or, the recording apparatus may first break down the pre-format information partly and then record post pre-format recording information into any other region than the regions in which the pre-format information is broken down so as to exhibit a DVD copying prevention function.

A recording method for an optical recording medium to which the present invention is applied is a recording method for an optical recording medium which has a guide portion formed in advance for guiding a light beam and a plurality of address portions for specifying individual positions of the guide portion. In the recording method, position information of a recording region in which significant information which can be reproduced based on a predetermined format is recorded along the guide portion and a breakdown region which is part of the guide portion or/and the address portions and is broken down so as not to be detected using the light beam is detected. Then, the position of the light beam is controlled based on the position information so that the light beam is positioned at a desired position on the optical recording medium. Then, the light beam is emitted to a breakdown region to thermally break down the breakdown region. Here, whether information should be recorded or thermal breakdown should be performed is selected depending upon the magnitude of the temperature rise to be provided to a focused point of the light beam on the optical recording medium. When it is tried to reproduce information from the optical recording medium on which the information is recorded using such a recording method as described above, where each breakdown region is known in advance, reproduction of the optical recording medium avoiding the region, that is, nonlinear reproduction, can be carried out. However, it is not possible to perform reproduction (linear reproduction) continuously from the inner circumference side to the outer circumference side to perform one-to-one copying of digital data.

An optical recording medium to which the present invention is applied is an optical recording medium which has a guide portion formed in advance for guiding a light beam and a plurality of address portions for specifying individual positions of the guide portion. The optical recording medium includes a region in which the guide portion for guiding the light beam for recording significant information and a plurality of address portions for specifying individual positions of the guide portion are disposed, and another region in which any of the guide portion or/and the address portions is partly lost.

Such an optical recording medium as just described can be fabricated and distributed as a non-recorded optical recoding medium on which significant information is not recorded as yet. Such a non-recorded optical recording medium can be fabricated by using the recording apparatus described above to thermally break down a breakdown region while no information is recorded in the recording region. Further, an optical recording medium which has a region in which the guide portion and the address portions are disposed and another region in which one or both of the guide portion and the address portions are lost may be fabricated using an ordinary mastering and stamping process and distributed. Where such an optical recording medium as described above is distributed, a person who purchases the optical recording medium can use an optical recording medium having low laser emission power to produce an optical medium on which post pre-format recording information whose DVD copying can be prevented is recorded.

Further, such an optical recording medium can be fabricated and distributed as a recorded optical recording medium on which significant information is recorded already. Such a recorded optical recording medium as just mentioned can be fabricated, for example, using the recording apparatus described above to thermally break down the breakdown region but record, into the recording region, significant information which can be reproduced based on a predetermined format. Since such an optical recording medium as just described does not allow one-to-one copying of digital data, the copyright holder can be protected also where it is distributed widely.

In the following, the present invention is described in detail in connection with preferred embodiments thereof.

First Embodiment

First, a first embodiment of the present invention is described below. In the present embodiment, a DVD-R (in order to clearly indicate that a DVD-R is a recording medium, the term "DVD-R recording medium" is used so as to indicate a medium) is used as an optical recording medium. Therefore, a DVD-R recording apparatus and a DVD-R recording method which record on a DVD-R recording medium are used as an optical recording medium and an optical recording method which record post pre-format recording information on an optical recording medium. The DVD-R recording medium in the present embodiment has a one-to-one copying preventing function.

(DVD-R Recording Medium)

FIG. 1 schematically illustrates a pre-format of a DVD-R recording medium which is a known write-once read-many DVD recording medium in the related art. The pre-format of the DVD-R recording medium is configured so as to have affinity and reproduction compatibility with that of a DVD-ROM medium. In the following, the DVD-R recording medium is described briefly with reference to FIG. 1 beginning with the pre-format.

FIG. 1 particularly shows, in an enlarged scale, part of a recording face of a DVD-R recording medium in the form of a disk having a diameter of 12 cm. The recording face has a recording film of organic coloring matter which allows recording with a laser beam of a wavelength of 635 nm or another wavelength of 650 nm. The substrate of the DVD-R recording medium is made of polycarbonate and has a single spiral continuous groove (guide groove) 41 extending over a substantially overall area and formed by injection molding. A land 43 is formed between each adjacent circumferential portions of the groove 41. The groove 41 of the DVD-R recording medium according to the present embodiment is a form of a guide portion formed in advance for guiding a light beam.

The groove 41 has a width and a depth suitable for detection of a tracking error signal which allows tracking servoing which is servoing in a radial direction of the DVD-R recording medium in accordance with, for example, a differential phase detection method or a push-pull method and further allows recording of post pre-format recording information so as to have a favorable characteristic. Further, the groove 41 is formed in a state wobbled a little in a radial direction substantially in the shape of a sine wave in a single period so that it may be used as information for controlling the speed of rotation of the DVD-R recording medium and the clock frequency of recording data.

On each of the lands 43 between adjacent circumferential portions of the groove 41, grooves are formed as address pits 42 used for recording of address information such that they have a depth equal to that of the groove 41 but have a smaller width so that they may not be mixed into or detected as post pre-format recording information. Each address pit 42 is formed so as to extend in a radial direction and interconnect adjacent circumferential portions of the groove 41. The address pit 42 is formed so as to represent binary information of "1" or "0," and is formed at a position which corresponds to "1" while no such address pit is formed at a position which corresponds to "0." Such a recording film made of organic coloring matter as described above is formed so as to cover the groove 41, address pits 42 and lands 43. The address pits 42 of the DVD-R recording medium according to the present embodiment are a form of an address portion for specifying the position of a guide portion.

A light beam 44 is focused as a substantially circular spot on the recording face of the DVD-R recording medium by a focusing servoing action. The light beam 44 is disposed at a substantially central portion of a circumferential portion of the groove 41 as seen in FIG. 1 by a tracking servoing action. Meanwhile, the DVD-R recording medium is rotated by rotating force generated by a spindle motor (refer to FIG. 4) by a spindle servoing action. Consequently, the relative position of the light beam 44 to the DVD-R recording medium is moved in a tangential direction perpendicular to a radial direction.

Figure 2:
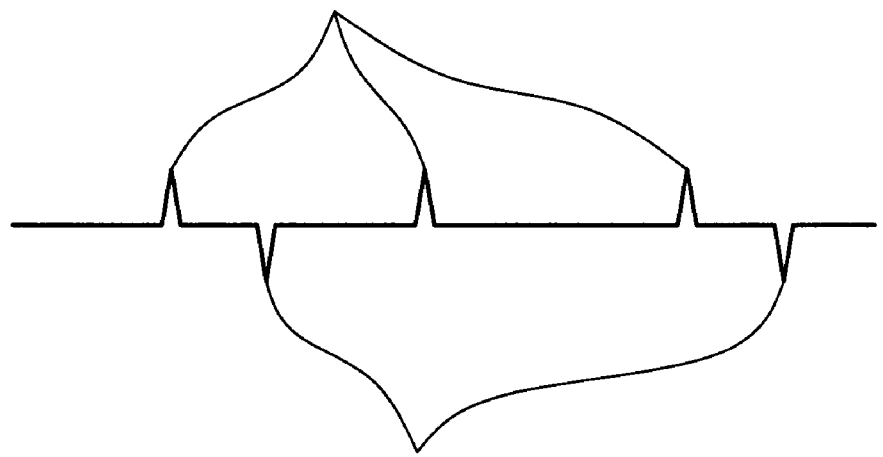
FIG. 2 is a waveform diagram illustrating a push-pull signal obtained as a difference signal from a photo-detector.

FIG. 2 illustrates a push-pull signal obtained as a difference signal from a photodetector 50a (refer to FIG. 5) when the light beam 44 moves along the groove 41. Referring to FIG. 2, the push-pull signal includes address pulses each originating from an address pit 42 on the inner circumference side and different address pulses each originating from another address pit 42 on the outer circumference side and having a polarity opposite to that of the first-mentioned address pulses. Accordingly, address information representing at which position the light beam 44 is disposed can be detected based on the first-mentioned address pulses or the second-mentioned address pulsed. Detection of address information is hereinafter described.

In such address arrangement as described above, if "0" of the binary information appears successively, then a state that no address pit 42 is recorded continues, and it is estimated that it is difficult to detect the position at which "0" should appear. Therefore, address information to be recorded as the address pits 42 is bi-phase modulated in advance so that only two "0s" successively appear in the maximum.

Since the address pits 42 formed in such a manner as described above have a very small dimension in the advancing direction of the light beam 44 as described above, they do not have an influence on post pre-format recording information obtained as a sum signal from the photodetector 50a. In this manner, the pre-format information does not have a bad influence on the detection of post pre-format recording information.

Figure 3:
FIG. 3 is a view illustrating a format of address information recorded for each sector depending upon a combination of address pits.

FIG. 3 illustrates a format of address information recorded as a combination of address pits 42 for each sector as preformat information. The SYNC part at the top of the format is formed from a synchronizing pattern of a plurality of address pits 42 arrayed in a predetermined array. The address data part following the SYNC part is used to specify the position of the DVD-R recording medium at which the pit is disposed depending upon the combination of address pits 42. The ECC parity part has recorded thereon ECCs (Error Correction Codes) for the information of the address data part. The ECCs are formed from Reed-Solomon codes. Here, the synchronizing pattern is decided so as not to appear in any of the address data part and the ECC parity part, and therefore can be detected readily.

(DVD-R Recording Apparatus)

Now, a DVD-R recording apparatus according to the present embodiment which records a signal on a DVD-R recording medium having such a configuration as described above is described. First, a general configuration of the DVD-R recording apparatus 10 is described briefly with reference to FIG. 4, and then a servo signal detection and address information detection section 100 of the DVD-R recording apparatus which handles the address pits 42 is described with reference to FIG. 5. In the present embodiment, the servo signal detection and address information detection section 100 forms part of a position information detection section and further forms part of a servo section.

Figure 4:
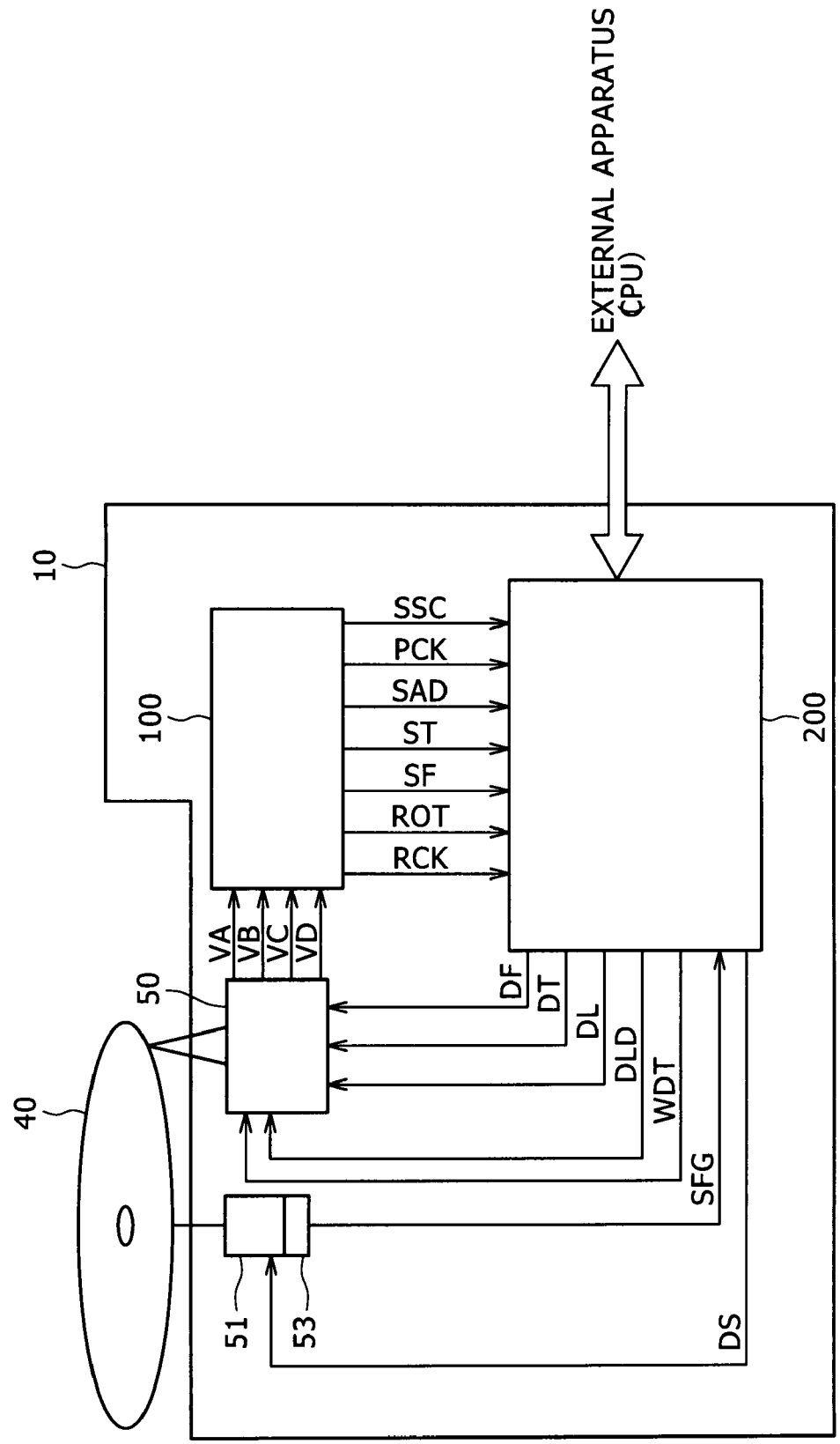
FIG. 4 is a block diagram showing a configuration of a DVD-R recording apparatus.

Referring first to FIG. 4, the DVD-R recording apparatus 10 is formed as an apparatus for recording information on a DVD-R recording medium 40. The DVD-R recording apparatus 10 includes an optical head 50, a servo signal detection and address information detection section 100, a spindle motor 52 and a control section 200 as principal components thereof. The control section 200 performs all control for writing information on the DVD-R recording medium 40 in accordance with an instruction from an external apparatus such as a CPU. In the present embodiment, an optical head 50 forms part of the position information detection section and forms part of the servo section and besides forms part of a laser light intensity adjustment section.

The optical head (optical section) 50 has an optical system including various optical parts. For example, a laser light source not shown for generating a laser beam, a laser light source control sedition not shown and a photodetector 50a (refer to FIG. 5) form part of the optical system. Further, the optical system includes an objective lens not shown, and the optical head 50 includes a focusing actuator not shown for varying the distance between the objective lens and the DVD-R recording medium 40. The optical head 50 further includes a tracking actuator not shown for moving the relative position of the objective lens and the DVD-R recording medium 40 in a radial direction. The optical head 50 further includes a sliding feed motor not shown for moving the relative position between the entire optical head 50 and the DVD-R recording medium 40 in a radial direction by an amount greater than that by the tracking actuator.

Figure 5:
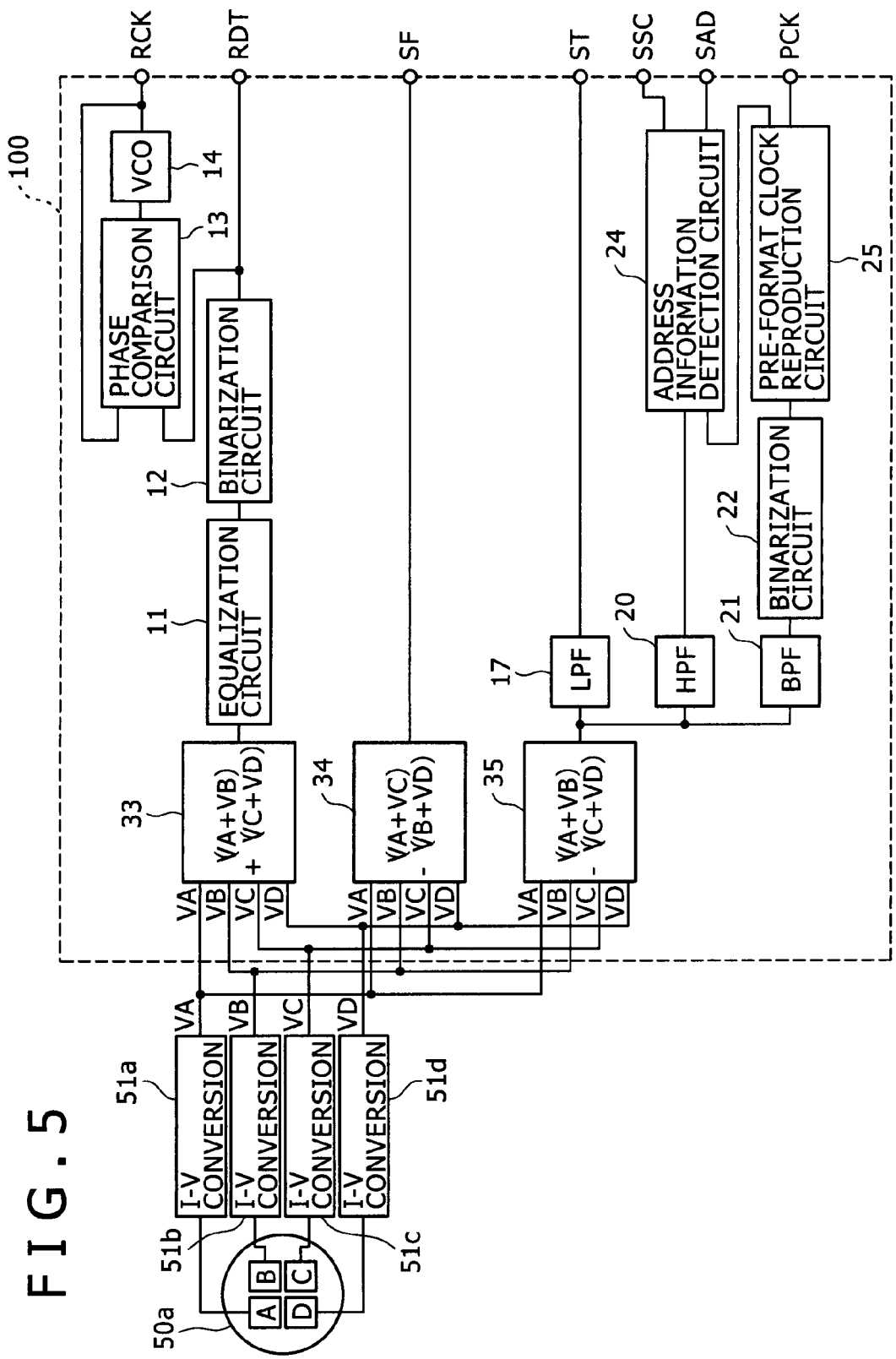
FIG. 5 is a block diagram showing a servo signal detection and address information detection section of the DVD-R recording apparatus.

Now, the servo signal detection and address information detection section 100 is described with reference to FIG. 5. A light beam 44 focused on the groove 41 in such a manner as seen in FIG. 1 is reflected from the DVD-R recording medium 40 and returns as returning light to the optical system. The returning light is detected by means of the photodetector 50a which includes four elements including PIN diodes A, B, C and D. Electric current obtained from the PIN diodes A to D is I-V converted (current to voltage converted) by the current to voltage converters (I-V converters) 51a to 51d thereby to obtain voltage signals VA, VB, VC and VD corresponding to the current obtained from the four diodes. The photodetector 50a and the I-V converters 51a to 51d are incorporated in the optical head 50.

The voltage signals VA to VD are inputted to computing units 33, 34 and 35 to obtain the following arithmetic operation signals. In particular, the computing unit 33 adds all of the voltage signals VA to VD to obtain VA+VB+VC+VD as a sum (addition) signal. The computing unit 34 performs an arithmetic operation of VA+V−VB−VD which is an arithmetic operation for obtaining a difference signal from the PIN diodes disposed in the diagonal directions thereby to obtain a focus error signal SF of the astigmatism type. The focus error signal SF obtained by the computing unit 34 is signaled to the control section 200 (refer to FIG. 4). In the present embodiment, the control section 200 forms part of the position information detection section, part of the servo section and part of the laser light intensity adjustment section.

The computing unit 35 performs an arithmetic operation of VA+VB−VC−VD to obtain a difference signal from the PIN diodes disposed in a radial direction to obtain a push-pull signal as an output of the computing unit 35. The signal obtained by the computing unit 35 represents a relative position of the light beam 44 to the groove 41 and an address pit 42. Therefor, also a wobble signal according to the wobbling of the groove 41 is reproduced simultaneously in addition to a tracking error signal ST. Further, when the light beam 44 passes the position at which an address pit 42 is recorded, a positive or negative address pulse is reproduced as seen in FIG. 2 depending upon whether the address pit 42 is positioned on the inner circumference side or the outer circumference side of the disk with respect to the groove 41.

Now, a method of separating the tracking error signal ST, wobble signal and address pulse is described. Only the tracking error signal ST can be obtained by passing the push-pull signal obtained by the computing unit 35 through a low-pass filter (LPF) 17. In particular, since the frequency of the wobble signal is higher than a frequency to which the objective lens can respond through the tracking actuator, even if the wobble signal is removed from the tracking error signal ST, this does not have a bad influence of the tracking servo characteristic. Therefore, the wobble signal is removed by means of the LPF 17.

Further, since the wobble signal included in the push-pull signal is included in a narrow band, a wobble signal of a high S/N can be obtained by using a band-pass filter (BPF) 21 which passes a signal within the bandwidth therethrough. The resulting wobble signal is binarized by a binarization circuit 22, and a pre-format clock PCK which is a clock component of format information is obtained based on the binary data. More particularly, the binary signal obtained by the binarization circuit 22 suffers from omission or disorder in waveform caused by dust or the like on the DVD-R recording medium. Therefore, a pre-format clock reproduction circuit 25 formed from a phase locked loop (PLL) is used to obtain the pre-format clock PCK from which the influence of such omission, disorder in waveform and so forth is eliminated. The pre-format clock PCK is divided by the control section 200 to obtain a spindle motor control signal.

Further, the pre-format clock PCK is inputted to an address information detection circuit 24, in which it acts as a clock signal for detecting address information SAD. In particular, a signal included in the push-pull signal and corresponding to an address pit 42 is passed through a high-pass filter (HPF) 20 to eliminate the influence of the wobble signal and the influence of noise in a low frequency band from the signal to detect only a component of the signal which is generated from an address pit 42 on one of the inner circumference side and the outer circumference side in accordance with the polarity. Thus, the address information SAD is decoded by the address information detection circuit 24 using the pre-format clock PCK as a reference clock. In particular, the address information detection circuit 24 separates the SYNC part to specify the substance of the address data part, performs error correction using the ECC parity and decodes the address information SAD. The address information SAD obtained by the address information detection circuit 24 is signaled to the control section 200. The address information detection circuit 24 in the present embodiment forms part of the position information detection section.

Further, information based on the DVD format of the post pre-format recording information is detected from the sum signal. In particular, since the sum signal has full compatibility with a signal detected from a DVD-ROM medium, it is possible to obtain the post pre-format recording information obtained from the DVD-R recording medium as reproduction data RDT and process the reproduction data RDT using a signal processing circuit similar to that which processes a signal from a DVD-ROM medium regardless of the signal obtained from the address pit 42 which is pre-format information.

More particularly, the sum signal is binarized, after the frequency characteristic in recording and reproduction is compensated for by an equalization circuit 11, by a binarization circuit 12 to obtain reproduction data RDT, and a reproduction clock RCK which is a clock of the reproduction data RDT is obtained from the binary data by means of a PLL circuit formed from a phase comparison circuit 13 and a voltage-controlled oscillator (VCO) 14. The reproduction data RDT and the reproduction clock RCK are sent to the control section 200 as described above and inputted to an LSI (integrated circuit) incorporated in the control section 200 so that various signal processes are performed therefor by the LSI.

As apparent from the foregoing description, as information detected from the pre-format of the DVD-R recording medium 40, a focus error signal SF, a tracking error signal ST, address information SAD and a spindle control signal can be obtained from a difference signal based on the voltage signals VA to VD from the photodetector 50a. Meanwhile, a reproduction clock RCK and reproduction data RDT are obtained as post pre-format recording information from a sum signal based on the voltage signals VA to VD. Here, where the DVD-R recording medium 40 is used in a normal use as prescribed in the standards for a DVD-R recording medium, interference between the difference signal and the sum signal described above does not occur. Thus, it is possible to record and reproduce video information, audio information and other digital information such as software for use with a PC as a sum signal in a format in conformity with the standards for a DVD-ROM medium. In this manner, the DVD-R recording medium 40 has high affinity with a DVD-ROM medium.

The control section 200 includes, as principal components thereof, an LSI for the signal process described above, an A/D converter, a D/A converter, a RAM (Random Access Memory), a ROM (Read Only Memory), peripheral circuits such as a power driver and a CPU (Central Processing Unit) for exclusive use for controlling the DVD-R recording apparatus which performs processing in accordance with a program stored in the ROM. Further, the control section 200 is connected to an external apparatus such as a CPU of a PC such that it communicates commands (instructions) and data with the CPU through a bus line. For example, upon DVD copying, the CPU of the PC signals a reading command to read a predetermined sector to the control section 200 through the bus line. Thus, the control section 200 decodes the reading command and signals data for each sector read out from the DVD-R recording medium in accordance with a predetermined procedure to the PC. In this manner, data of sectors are successively sent to the CPU, and the CPU successively sends the data of the sectors to a different recording medium not shown to perform DVD copying.

The control section 200 performs phase compensation for the focus error signal SF and outputs a focusing drive signal DF for controlling the focus position of the objective lens. The focusing drive signal DF is applied to the focusing actuator to operate the focusing servo system as a feedback control system thereby to condense the light beam 44 on the recording medium of the DVD-R recording medium 40.

It is to be noted that the control section 200 performs phase compensation for the tracking error signal ST and outputs a tracking drive signal DT. Here, the frequency band requisite for the tracking error signal ST is lower than the frequency of the wobble signal which is a sine wave signal generated from the wobbling. Therefore, the wobble signal little has an influence on the servo characteristic because of an action of the LPF 17. The tracking drive signal DT is applied to the tracking actuator to cause the tracking servo system to operate as a feedback control system thereby to dispose the light beam 44 at a substantially central portion of the groove 41.

The control section 200 arithmetically operates and generates a low frequency component of the tracking error signal ST to obtain a sliding feed control signal and multiplies the sliding feed motor control signal by phase compensation and a gain constant of a predetermined magnification to obtain a motor driving signal DL. The motor driving signal DL is outputted from the control section 200 and supplied to the sliding feed motor thereby to form a feedback control system which controls the relative position in a radial direction over a range greater than the range which is taken charge of by the tracking actuator.

Further, upon recording of information on the DVD-R recording medium, the control section 200 compares the preformat clock PCK and the reference frequency generated by the control section 200 with each other to obtain a spindle error signal. Then, the control section 200 performs phase compensation for the spindle error signal to obtain a spindle motor driving signal DS. The spindle motor 52 is driven in accordance with the spindle motor driving signal DS to rotate the DVD-R recording medium 40 in a predetermined mode such as the CLV (Constant Linear Velocity) or the CAV (Constant Angular Velocity) and at a predetermined speed of rotation. The spindle servo system formed in this manner operates as a feedback control system and disposes the light beam 44 in a tangential direction of the DVD-R recording medium.

On the other hand, upon reproduction of information recorded on the DVD-R recording medium, the control section 200 compares and arithmetically operates the reproduction clock RCK and the reference frequency generated by the control section 200 to obtain a spindle error signal. Further, the control section 200 performs phase compensation for the spindle error signal to obtain a spindle motor driving signal DS. Then, the spindle motor 52 is driven in accordance with the spindle motor driving signal DS to rotate the DVD-R recording medium 40 in a predetermined mode such as the CLV (Constant Linear Velocity) or the CAV (Constant Angular Velocity) and at a predetermined speed of rotation. The spindle servo system formed in this manner operates as a feedback control system and disposes the light beam 44 in a tangential direction of the DVD-R recording medium.

Further, the control section 200 controls the laser light source control section in accordance with a laser light source driving signal DLD. In ordinary reproduction, the light beam from the laser light source which is controlled with the laser light source control signal is controlled so as to have such a low light intensity that the laser light does not vary the reflective index of the recording medium formed from organic coloring matter. Meanwhile, in ordinary recording, the laser light is controlled so as to have such another light source intensity that the laser light does not thermally break down the groove 41 and the address pits 42 but varies the reflective index of the recording medium to record "1" whereas it is controlled so as to have a low light intensity to record "0." The modulation for "1" and "0" is performed in accordance with a recording signal WDT. Processes unique to the present embodiment and other processes which are performed by the control section 200 are hereinafter described suitably.

(Principle of Duplication Prevention of the DVD Recording Apparatus)

The principle of prevention of duplication (DVD copying) by the DVD-R recording apparatus according to the present embodiment is described. As described hereinabove, the reading procedure of information from the DVD-R recording medium by a DVD-ROM reproduction apparatus for reproduction as a consumer appliance is different between a case wherein information recorded on the DVD-R recording medium is reproduced (that is, in a case wherein data recorded in the DVD-VIDEO format is reproduced as an image) and another case wherein DVD copying is performed using a PC. Therefore, such reading procedures are described first.

Figure 6:
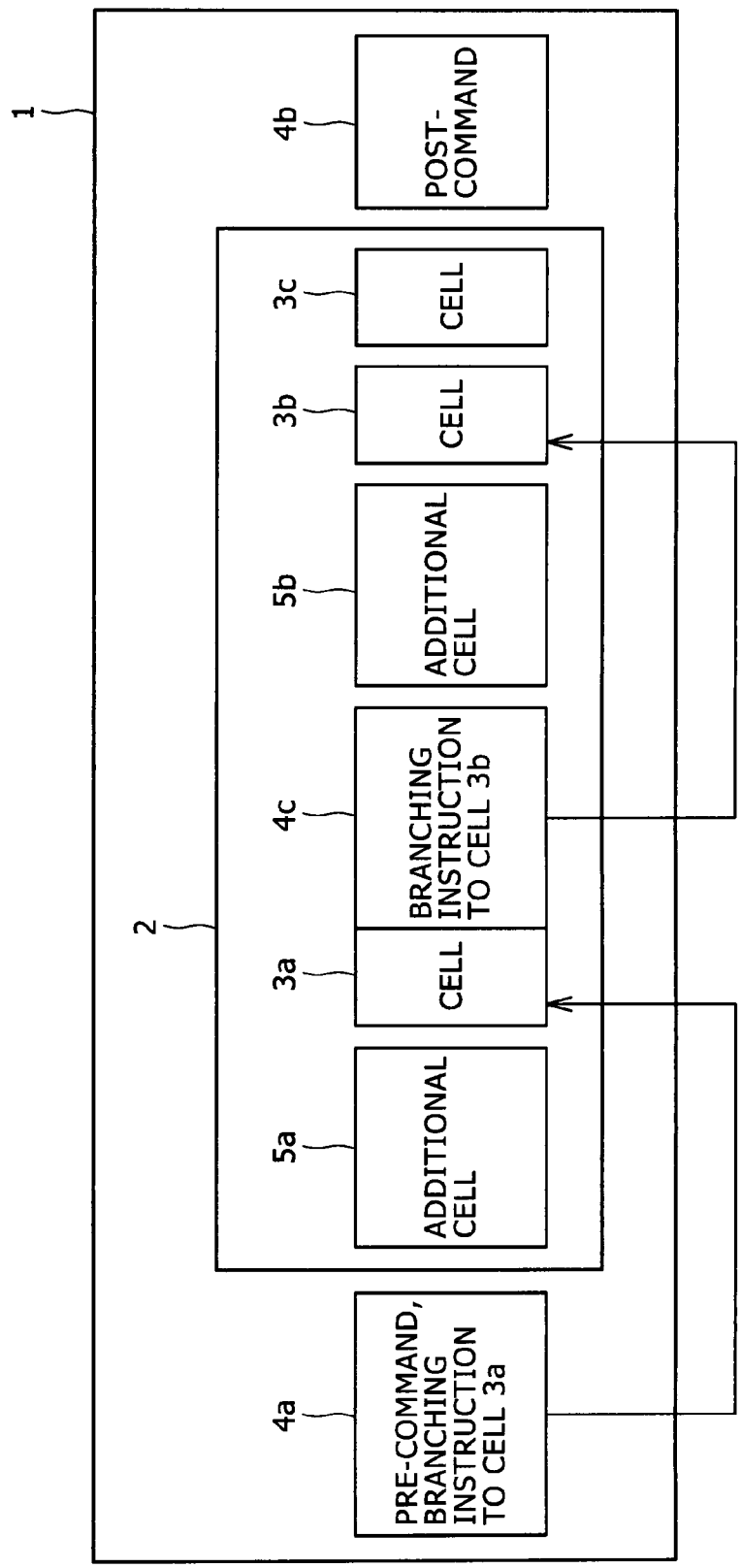
FIG. 6 is a flow diagram illustrating a reading procedure of information from the DVD-R recording medium.

FIG. 6 illustrates a reading procedure of information from the DVD-R recording medium. Referring to FIG. 6, according to the standards for reproduction of DVD video information, recorded information has a plurality of cells to which individually unique IDs (identification numbers) are applied. A program chain 1 indicates a reproduction order of the cells, and the reproduction order is determined within the program chain 1 separately from the ID numbers of the cells. The program chain 1 including a program 2 shown in FIG. 6 includes cells 3*a*, 3*b* and 3*c*, a pre-command 4*a* which is a navigation command applied to the last end of the program 2, a post-command 4*b* which is a navigation command applied to the top of the program 2 and a cell command 4*c* included in a cell. The left side of the plane of FIG. 6 indicates the inner circumference side with respect to the arrangement of information recorded spirally on the DVD-R recording medium and represents that recorded information is arranged continuously from the left to the right.

The program chain 1 to be read out by a DVD-R reproduction apparatus having a DVD video reproduction function is configured, for example, in such a manner as described below. In particular, a first additional cell 5*a* which is a bypass region is inserted prior to the first cell 3*a*, and a second additional cell 5*b* is added to the front of the second cell 3*b*, and a first branching instruction is written in the pre-command 4*a* while a second branching instruction is written in the cell command 4*c*. Then, the destination address of the first branching instruction is set to the cell 3*a*, and the destination address of the second branching instruction is set to the cell 3*b*. In this manner, the pre-command 4*a* is set such that the DVD-R reproduction apparatus starts reproduction from the first cell 3*a* but does not access the additional cell 5*a*, and the cell command 4*c* is set such that the DVD-R reproduction apparatus reproduces the cell 3*b* continuously to reproduction of the first cell 3*a* but does not access the additional cell 5*b*. Thus, nonlinear reproduction is performed.

Here, even if the additional cells 5*a*, 5*b* and 5*c* are non-reproducible cells, they do not make any obstruction to reproduction of the program chain 1. On the other hand, where one-to-one DVD copying is to be performed continuously, since navigation data for avoiding reproduction of such additional cells 5*a*, 5*b* and 5*c* as described above are not used, linear reproduction is performed, that is, in order of the additional cell 5*a*, first cell 3*a*, second additional cell 5*b*, second cell 3*b* and third cell 3*c*. Accordingly, in DVD copying, the substance of the additional cells 5*a*, 5*b* and 5*c* may not be read, and the duplication operation is interrupted.

In this instance, the information recorded in the additional cells 5*a*, 5*b* and 5*c* is, for example, such as follows. (1) Coding in a rule other than EFM+ (Eight to Fourteen Modulation plus); (2) alteration of the format of the ECC (Error Correction Code); (3) alteration of the format of the ID (Identification Data); (4) alteration of the IED (ID Error Correction); (5) alteration of the format of the CPR_MAI (Copyright Management Information); and (6) alternation of the format of the EDC (Error Detection Code).

Here, the EFM+ is a format for modulation and converts 8-bit recording data (data prior to modulation) into 16-bit channel data (data after conversion). The ECC adds RS (Reed-Solomon) codes of 10 bytes to horizontally 172 bytes and adds RS (Reed-Solomon) codes of 16 bytes to vertically 192 rows. The ID adds an ID of 4 bytes for each 2K bytes (kilobytes). The IED adds 2 bytes to the ID of 4 bytes so that the ID can be read by simple and easy error correction. The EDC is a code of 4 bytes added to main 2K byte data, ID, IED and CPR_MAI such that it can be checked based on the EDC code whether or not the scramble is correct and whether or not correction is performed in error.

To use such a navigation command as described above in order to prevent DVD copying merely is one of options, and another option may be, for example, to utilize an interleave structure prescribed in the DVD video standards. The original object of such an interleave structure as just described is to construct a bus for parallel reproduction so as to allow seamless movement between paths. However, the interleave structure can be utilized as a countermeasure for the prevention of DVD copying which involves linear reproduction.

The structure of an interleave block 6 is shown in FIG. 7. The interleave block 6 is composed of interleave units including two parallel paths 7 and 8 as components thereof. The path 7 includes interleave units 7a, 7b and 7c while the path 8 includes interleave units 8a, 8b and 8c. On a DVD-R medium, the interleave unit 8a, interleave unit 7a, interleave unit 8b, interleave unit 7b, interleave unit 8c and interleave unit 7c are recorded in this order in a tangential direction. On a DVD video reproduction apparatus, it is scheduled to perform non-linear reproduction wherein interleave units of one of the path 7 and the path 8 are linked while the other interleave units are bypassed. However, in DVD copying which is performed as copying of digital data using a PC, the data are reproduced in order from the beginning thereof (linear reproduction is performed), and the reproduced data are copied. Accordingly, for example, if information which may not be reproduced is recorded on the path 8 which does not contribute to reproduction of the DVD video information, then no problem occurs with reproduction of the DVD video information, but if it is tried to perform DVD copying, then the reproduction is disabled, resulting in prevention of duplication.

In particular, the information recorded in the interleave units 8a, 8b and 8c is, for example, such information as (1) coding in a rule other than EFM+; (2) alteration of the format of the ECC; (3) alteration of the format of the ID; (4) alteration of the IED; (5) alteration of the format of the CPR_MAI; and (6) alternation of the format of the EDC.

The countermeasure for the prevention of DVD copying described above is reasonable and effective to a PC which includes a DVD-R reproduction apparatus which performs only reproduction of a DVD-R recording medium, but sometimes fails to sufficiently prevent DVD copying where a PC which includes a DVD-R recording and reproduction apparatus which performs recording and reproduction on and from a DVD-R recording medium. Such an instance as just described is described below.

The most significant difference between a DVD-R recording and reproduction apparatus and a DVD-ROM reproduction apparatus as viewed from a DVD copying function is that, while the DVD-ROM reproduction apparatus does not have a function of reading pre-format information because it is an apparatus configured taking only the compatibility with a DVD-ROM into consideration, the DVD-R recording and reproduction apparatus has a function of reading pre-format information. Further, the DVD-R recording and reproduction apparatus is different from the DVD-ROM reproduction apparatus in that it is set such that, when post pre-format recording information may not be read, the control section of the DVD-R recording and reproduction apparatus reads pre-format information and performs an avoiding operation after detection of a predetermined abnormal state based on the pre-format information. As a result, where the DVD-R recording and reproduction apparatus is used to perform DVD copying, the countermeasure for copying prevention described above may not possibly produce good results.

[1] (1) When coding is carried out in a rule other than EFM+; (2) in the case of alteration of the format of the ECC; and (6) in the case of alternation of the format of the EDC of a sector data portion. In those cases, the DVD-R recording and reproduction apparatus decides that information is read within a non-recorded region in which post pre-format recording information is not written and thus operates so as to search for a next recording region based on the pre-format information. As a result, the post pre-format recording information at such portions is ignored, and consequently, stopping of reproduction does not occur and hence stopping of DVD copying does not occur.

[2] (3) In the case of alteration of the format of the ID; (4) in the case of alteration of the IED; and (6) alternation of the format of the EDC of an ID portion. In those cases, since the current ID may not be detected from post pre-format recording information, an operation of reading pre-format information is carried out. Then, after the ID obtained from the pre-format information (ID preformatted on the DVD-R recording medium) is detected, the ID of the post pre-format recording information is estimated based on a predetermined conversion table or a predetermined arithmetic operation expression to obtain an ID and the reproduction process is continued. However, if such recorded information is not detected, then the processing advances similarly as in the case [1] described hereinabove, and DVD copying is not disturbed.

[3] (5) In the case of alteration of the format of the CPR_MAI. In DVD copying, copying is performed frequently without being influenced by CPR_MAI, and in this instance, DVD copying is not disturbed.

In a DVD copying prevention method of the present embodiment whose functions are expanded, attention is paid to pre-format portions. In particular, reproduction of a pre-format portion is made difficult to make the countermeasure for DVD copying prevention more effective. In the following, the substance of the DVD copying prevention method is described particularly.

As described hereinabove, a pre-format portion of the DVD-R recording medium is formed as phase grooves or phase pits having variations in the depthwise direction (direction perpendicular to the surface of the DVD-R recording medium). Diffracted light from such a phase groove or a phase pit as just mentioned is detected as an electric signal by the photodetector (refer to the photodetector 50a of FIG. 5) through the objective lens thereby to indirectly detect the shape of the phase groove or the phase pit. Consequently, tracking servoing along the groove (refer to the groove 41 of FIG. 1) is permitted and detection of an address is permitted from the address pits (refer to the address pits 42 of FIG. 1). Further, the electric signal detected by the photodetector is detected as diffracted light reflected from the recording film of organic coloring material.

Accordingly, if the shape of the groove, the shape of the address pits or the reflection factor of the recording film is made physically different from an ordinary one from which an ordinary reproduction characteristic is obtained, then the prepit information may not be obtained from the groove or the address pits. Therefore, when the DVD-R recording and reproduction apparatus may not read out post pre-format recording information, even if it tries to read pre-format recording information and perform an avoiding operation after detection of a predetermined abnormal state based on the pre-format information, it may not perform such avoiding operation. Consequently, DVD copying can be prevented with a higher degree of certainty.

In the first embodiment, a physical structural variation which may not be detected based on an electric signal from the photodetector 50a may be provided to the address pits 42. This makes detection of an address from the address pits 42 difficult and can prevent DVD copying. This is described more particularly below.

Tracking servoing is carried out such that the light beam 44 traces the groove 41 as seen in FIG. 1. Here, the information at the position of an address pit 42 (an address pit 42 exists when the information is "1," but no address pit 42 exists when the information is "0." Further, the representation of the position of an address pit 42 signifies a position on the DVD-R recording medium at which part of address information of "1" or "0" is obtained), address information SAD (refer to FIG. 5) is obtained using the pre-format clock PCK (refer to FIG. 5) as a reference clock for obtaining bit synchronism and setting the synchronizing signal for obtaining sector synchronism to the SYNC part (refer to FIG. 3).

Since the DVD-R recording medium formed from a polycarbonate substrate is deformed by application of heat thereto, it is possible to thermally deform the polycarbonate at the position of an address pit 42 so as to make it difficult to detect whether or not there exits a pit at the position of that address pit 42, that is, make detection of "1" or "0" difficult. Such thermal deformation can be caused by irradiating a light beam having a sufficiently high light intensity or decreasing the relative speed of rotation between the DVD-R recording medium and the light beam 44. The region which involves such thermal deformation in the present invention is a form of a breakdown region.

FIG. 8 illustrates a relationship between the signal to noise ratio (S/N) and heat generated by the light beam 44 when "1" or "0" is detected from information at the position of an address pit 42. Here, the heat provided to the polycarbonate substrate from the light beam 44 increases substantially in proportion to the recording laser power of the semiconductor laser disposed on the optical head 50 (refer to FIG. 4) but increases in inverse proportion to the square root of the speed of rotation of the DVD-R recording medium. Also the thermal deformation at the position of an address pit 42 is caused by heat generated by the light beam 44. Then, if the signal to noise ratio (S/N) is lower than a predetermined threshold value TH, then it is difficult to detect address information from the address pit 42 because of thermal deformation.

In the schematic view of FIG. 1, in order to facilitate understanding of the address pits 42, the address pits 42 are shown such that the frequency of appearance of the position of an address pit 42 is high. Actually, however, the frequency of appearance of the position of an address pit 42 is lower than that in FIG. 1. Accordingly, even if a portion of the polycarbonate substrate in the proximity of the position of an address pit 42 is broken down by heat of the light beam 44, the thermal deformation does not reach the other wobbled portion of the groove 41. Consequently, no obstacle is made to detection of the tracking error signal ST and the pre-format clock PCK. Accordingly, such thermal deformation of the polycarbonate substrate at the position of an address pit 42 provides an advantage that tracking servoing can be performed accurately along the groove 41 without being disordered while the portion of the polycarbonate substrate only at the position of the address pit 42 can be broken down accurately to obtain address information. As a result, various error signals for servoing are damaged only in the proximity of the broken down region, and therefore, the burden on servo processes of the DVD-R recording and reproduction apparatus is light.

Control of the laser power is carried out by the control section 200. In order to thermally deform the polycarbonate substrate over a predetermined range at the position of an address pit 42, focusing servoing and tracking servoing are rendered operative so that the light beam 44 traces the groove 41. Then, immediately after address information is decoded and the SYNC part of an address immediately preceding to the position of an address pit 42 to be broken down is detected, an address detection counter (not shown) disposed in the control section 200 for breaking down the address data part (refer to FIG. 3) is rendered operative. Then, the positions of the successive address pits 42 within a predetermined range are successively detected by extrapolation. Here, the reason why the position of each address pit 42 is detected by extrapolation is that, since the recording laser power is increased, the I-V converters 51*a* to 51*d* may be saturated, resulting in difficulty in detection of a difference signal, which makes it difficult to obtain information of "1" or "0" which forms the address information SAD from the position of the address pit 42.

The address detection counter disposed in the control section 200 has a function of counting, after it once finds out a SYNC part signal SSC which is a signal representative of the SYNC part (refer to FIG. 3) by a process of the servo signal detection and address information detection section 100 (refer to FIG. 4), the number of pulses of the pre-format clock PCK to detect information at the position of an address pit 42 by extrapolation. The address detection counter in the present embodiment forms part of the position information detection section.

In the first embodiment, where the I-V converters 51*a* to 51*d* are saturated by a light intensity which applies thermal deformation at the position of an address pit 42, the address information SAD is not obtained and besides also the focus error signal SF and the tracking error signal ST are not obtained, which increases the probability in erroneous servoing operation. Therefore, the portion at the position of the address pit 42 is masked such that preceding values of the focus error signal SF and the tracking error signal ST are held.

Where the light beam 44 having a high light intensity is irradiated to cause thermal deformation to occur at the position of an address pit 42 so as to make it difficult to detect the address information SAD, every time the SYNC part signal SSC is detected, the control section 200 performs an arithmetic operation for estimating the position of a next address pit 42 to detect the position. Further, where thermal deformation is caused including also the SYNC part, the control section 200 arithmetically operates the position of a plurality of successive address pits 42 extrapolated by the address detection counter described hereinabove. Further, the control section 200 controls the laser light source control section disposed on the optical head 50 using a laser light source driving signal DLD to raise the light intensity of the light beam 44. By this, while the speed of rotation of the DVD-R recording medium is kept fixed, thermal breakdown can be caused at the address pits 42 (including thermal deformation of such a degree that degradation of the S/N ratio which makes reading of information difficult is caused to occur).

Further, as seen from the graph of FIG. 8, upon thermal breakdown at the position of an address pit 42, the speed of rotation of the DVD-R recording medium may be set to a lower speed without setting the same to an ordinal speed of rotation used when post pre-format recording information is to be read out without raising the recording laser power. In this instance, the control section 200 first outputs a spindle motor driving signal DS for causing the spindle motor 52 to rotate at a low speed. Consequently, the address pit 42 can be thermally broken down to make it difficult to read the address information SAD. According to this method, thermal breakdown at the position of the address pit 42 can be performed while the light intensity of the light beam to be emitted from the laser light source disposed on the optical head 50 is kept low. It is to be noted that, in this instance, except the portion at which the address pit 42 is disposed, the light intensity of the light beam to be emitted from the laser light source is controlled to a still lower level so that no thermal breakdown may occur except at the position of the address pit 42.

In both of the case wherein the light beam 44 having a high light intensity is irradiated to cause thermal deformation to occur at the position of an address pit 42 so as to make it difficult to detect the address information SAD and the case wherein the speed of rotation of the DVD-R recording medium is set to a still lower level to cause thermal deformation to occur around an address pit 42 to make detection of the address information SAD difficult, only the address part in which the address information SAD is included may be thermally broken down, only the ECC parity part may be thermally broken down so as to disable error correction and reproduction of the address information SAD or both of the address part and the ECC parity part may be thermally broken down. Furthermore, the SYNC part may be thermally broken down to make it difficult to detect the address information SAD from the pre-format information.

The range over which thermal deformation described hereinabove is caused around an address pit 42 corresponds to an additional cell portion (refer to the additional cell 5a or 5b of FIG. 6) which is a region in which post pre-format recording information which includes no significant information is to be recorded. Thus, the post pre-format recording information at the additional cell portion may not be reproduced by the LSI disposed in the control section 200.

The post pre-format recording information which may not be reproduced by the LSI disposed in the control section 200 and does not correspond to significant information may be information for which any of such processes as (1) coding in a rule other than EFM+; (2) alteration of the format of the ECC; (3) alteration of the format of the ID; (4) alteration of the IED format; (5) alteration of the format of the CPR_MAI; and (6) alternation of the format of the EDC as described hereinabove is performed or a combination of two or more of such processes is performed. Further, the (1) coding in a rule other than EFM+ includes, in addition to coding whose rule itself is different like, for example, 1-7 modulation, coding which includes an out-of-EFM+ pattern (pattern which does not exist in the EFM+ format) which is not applied in a code table prescribed in advance as a block code although the coding rule itself conforms to that of the EFM+. Information for which such processing is performed may not be reproduced by an LSI used for an ordinary DVD-R recording apparatus as described hereinabove.

Several particular examples of post pre-format recording information which may not be reproduced by the LSI disposed in the control section 200 are described below with reference to FIGS. 9A to 9K. It is to be noted that FIG. 9A illustrates an interval within which post pre-format recording information is recorded, and FIG. 9B illustrates the channel bit clock.

FIG. 9C illustrates post pre-format recording information which includes only "1" as post pre-format recording information which may not be reproduced by the LSI disposed in the control section 200. Further, though not shown in FIGS. 9A to 9K, it is possible to read information only of "0" without recording information only of "1" as post pre-format recording information. In this instance, when compared with a portion recorded in the DVD-R format, the portion at which only "0" is recorded has a high reflection factor, and as a result, the open loop gain of the servo systems is high. However, where only "1" is recorded, a low reflection factor is exhibited, and as a result, the open loop gain of the servo system is low. However, no trouble occurs with operation where the control section 200 has an automatic adjustment function for the open loop gain. By using information in which both of successive "0s" and "1s" can be generated simply such that the substance of post pre-format recording information is made different from that based on the DVD format in this manner, reproduction of the post pre-format recording information by the LSI for signal processing can be made difficult. In such an instance, simple hardware can be provided additionally without altering the LSI disposed in the control section 200 or "1" and "0" can be generated directly from the CPU such that the recording signal WDT from the control section 200 is controlled to "1" or "0." Therefore, an advantage that there is no necessity to modify the LSI at all can be achieved.

Further, as seen from FIG. 9E or 9F, in post pre-format recording information which may not be reproduced by the LSI disposed in a different control section 200, the relationship between the speed of rotation of the DVD-R recording medium and the channel clock, that is, the recording density in a line direction (tangential direction), may be displaced from that of the DVD format. According to such post pre-format recording information wherein the recording density in a line direction varies for each recording region, while the DC-free nature is maintained to suppress the burden on the servo systems low, reproduction of the post pre-format recording information by an LSI for signal processing can be made difficult. It is to be noted that FIG. 9D illustrates post pre-format recording information where it is recorded in a prescribed recording density.

In particular, FIG. 9E illustrates post pre-format recording information where the speed is doubled, that is, where the recording density described above is doubled, and FIG. 9F illustrates post pre-format recording information where the speed is reduced to ½ time, that is, where the recording density is reduced to ½ time.

Further, as seen from FIG. 9G, for the post pre-format recording information which may not be reproduced by the LSI disposed in a different control section 200, post pre-format recording information which depends not upon inter-mark modulation but upon pit position modulation may be used. For the post pre-format recording information illustrated in FIG. 9G, 1-7 modulation is used.

Further, as seen from FIG. 9H, for the post pre-format recording information which may not be reproduced by the LSI disposed in the different control section 200, output data having a combination of arbitrary mark lengths synchronized with the channel clock may be used. Here, the combination of arbitrary mark lengths is preferably subject to DSV control hereinafter described as seen in FIG. 9J. However, the combination may not be subject to the DSV control as seen from FIG. 9K.

Further, as seen in FIG. 9I, for the post pre-format recording information which may not be reproduced by the LSI disposed in the different control section 200, output data having a combination of arbitrary mark lengths asynchronous with the channel clock may be used.

Upon generation of the output data illustrated in FIGS. 9H to 9K, information based on random number information of "1" and "0" from a random number generator disposed in the control section 200 may be generated. In such an instance, simple hardware can be added or a random number can be generated directly from the control section 200 without altering the LSI disposed in the control section 200. Therefore, an advantage that there is no necessity to alter the LSI at all can be achieved. This is because the simple hardware or the control section 200 can directly generate a pulse or a random number such that the laser light source control section can be controlled with the laser light source driving signal DLD which is modulated with the pulse or random number and the processing can be preformed without relying upon the LSI. It is to be noted that, also where the LSI is altered, such a signal as described above can be generated by simple alteration of the LSI. It is to be noted that, where DSV control is involved, the control section 200 determines a cumulatively added value of the DSV hereinafter described and sets the cumulatively added value within a predetermined interval to zero.

Further, for the post pre-format recording information which may not be reproduced by the LSI disposed in the different control section 200, the CD (Compact Disk) format is available though not shown in FIGS. 9A to 9K. Such a format as just mentioned can be used to record post pre-format recording information. Many DVD-R recording and reproduction apparatus incorporated in PCs have a function which can record and reproduce information on and from a CD-R (Compact Disk Readable) recording medium. In this instance, by controlling an LSI for signal processing by means of a CPU or fabricating a new IC for partially modifying the wiring scheme of the LSI for signal processing, recording of post pre-format recording information in the CD format can be performed readily.

Further, where DSV control is performed in the forms of various output data illustrated in FIGS. 9A to 9K, since an organic coloring matter film whose reflection factor decreases when the light beam 44 is irradiated thereupon is used popularly in a DVD-R recording medium, recording of DC-free information of "1" and "0" is performed. Therefore, the bad influence on the servo systems whose open loop gain depends upon the returning light amount to the photodetector 50a is little.

Now, the DSV (Digital Sum Value) which is a concept of a DC-free condition and is a concept involved in encoding for satisfying a condition for establishing a DC-free condition is described briefly. Usually, mark length recording is adopted as a recording format in optical recording. In this instance, within an interval of an inverted interval length, channel coding wherein "1" or "0" appears successively is performed. Here, in recording, the laser light source is modulated such that, for example, for "1," the emitted light of the laser has an intensity sufficient to record information on the recording film, and for "0," the emitted light has an intensity with which information is not recorded on the recording film. On the other hand, in reproduction, for "1," for example, the reflection factor of the recording medium is low and the level of the returning light is low, and for "0," the reflection factor of the recording medium is high and the level of the returning light is high. Here, the cumulatively added value within a predetermined interval (predetermined time) where "1" corresponds to +1 and "0" corresponds to −1 and +1 and −1 which are generated in a time series are cumulatively added is called DSV, and a case wherein the value of the DSV is substantially equal to zero is called DC-free.

Although it is difficult to implement a complete DC-free condition, in order to obtain a characteristic proximate to a DC-free characteristic, in block encoding such as EFM or EFM+, the DSV is calculated over a predetermined length and the DSV value is set to zero by a coupling bit or by selecting, from within one block of blocked data, one of a plurality of blocked channel data within which the value of the DSV is + or −. Also where the RLL (variable length code) is used, the DSV is calculated over a predetermined period, and a DSV control bit for setting the DSV to zero is inserted suitably so that the DSV becomes substantially equal to zero. Also in the bit position recording illustrated in FIG. 9F, a similar technique may be used to implement a DC-free condition. The effect by the DC-free condition is that, for the servo systems, the configuration of the servo sections can be simplified by setting the high frequency component higher than the frequency band of servoing. Meanwhile, for the signal processing system, the configuration of the signal processing section can be simplified utilizing the fact that correction against asymmetry can be implemented by a simple feedback system.

However, also in the examples of FIGS. 9G and 9J which involve no DC-free condition, for the servo systems, stabilized servoing can be achieved by using an automatic adjustment circuit for an open loop gain of such a high speed that it can follow up the response of the servo band. For the signal reproduction system, no particular problem occurs in the present embodiment which is directed to post pre-format recording information which may not be reproduced by the LSI disposed in the control section 200.

As described above, after the address pits 42 are thermally broken down, management information representative of the positions (addresses) of the broken down regions is written as post pre-format recording information in a DVD-R format in a predetermined region of the DVD-R recording medium such as at an innermost circumferential portion or an outermost circumferential portion. This makes it possible to non-linearly reproduce, upon reproduction of images, the post pre-format recording information from the DVD-R recording medium avoiding the regions wherein the address pits 42 are broken down. Further, where regions in which thermal breakdown should be performed for an address pit 42 are specified in advance, or where regions in which thermal breakdown should be performed for the address pits 42 are provided from another medium such as a flexible disk, there is no necessity to record the positions of the broken down regions on the DVD-R recording medium.

Now, operation where information of a DVD-R recording medium for which the process described above is performed is DVD copied on another recording medium using a PC is described.

As described hereinabove, in DVD copying, post pre-format recording information is linearly reproduced, that is, successively reproduced along a physically continuous spiral so that it is successively copied on a different recording medium. Thereupon, also additional cell portions which do not include significant information are reproduced. Here, the additional cell portions are subject to (1) coding in a rule other than EFM+; (2) alteration of the format of the ECC; (3) alteration of the format of the ID; (4) alteration of the IED format; (5) alteration of the format of the CPR_MAI; or (6) alternation of the format of the EDC; or are (7) such that the post pre-format recording information is entirely or partly recorded as information based on random number or pulse information; (8) such that the post pre-format recording information is entirely or partly recorded as information in the CD format; (9) information whose line direction recording density varies for each recording region; or (10) such that they form a non-recorded region or regions. In any of the cases (1) to (10), the substance of the post pre-format recording information may not be reproduced by an LSI for signal processing for a DVD.

In this instance, although the DVD-R recording and reproduction apparatus tries to continue reproduction replacing with pre-format information based on a function provided therefor, since the address pits 42 are thermally broken, the address information SAD may not be read. As a result, the control section 200 stops the DVD copying operation and signals information representing that DVD copying is difficult to a CPU of the PC as an external apparatus. DVD copying is prevented in this manner.

In this manner, where an apparatus for reproduction only is used to reproduce an image from a DVD-R recording medium on which information is recorded in such a manner as described above, nonlinear reproduction wherein additional cell portions which do not include significant information are skipped is performed. Consequently, no trouble occurs with the reproduction operation. Accordingly, where the DVD-R recording medium is not an illegal copy, there is no trouble in the reproduction operation thereof.

Here, although regions of the address pits 42 and portions of the groove 41 in the proximity of the address pits 42 are thermally broken down, any other region of the groove 41 is not thermally broken down. Therefore, in such nonlinear reproduction as described above, the thermally broken regions have no influence on any of tracking servoing, focusing servoing and spindle servoing from a relationship to the servoing frequency band. Therefore, servoing operations are performed regularly. As a result, accessing to significant cells in reproduction is performed readily, and stable nonlinear reproduction can be anticipated. The significant cells here signify cells which include only significant information.

The thermal breakdown of regions of the address pits 42 and the groove 41 in the proximity of the address pits 42 described above can be carried out such that, while information is recorded on a DVD-R recording medium, every time the light beam 44 reaches a region to be thermally broken down, the control section 200 controls the laser light source driving signal DLD to increase the light amount of the light beam 44. However, the thermal breakdown may be carried out otherwise such that, after all information is recorded on a DVD-R recording medium with a light amount of the light beam 44 for ordinary recording, thermal breakdown of the regions of the address pits 42 and the groove 41 in the proximity of the address pits 42 in a predetermined region is carried out in accordance with an instruction from the control section 200.

According to the thermal breakdown of the pre-format region in which the address pits 42 and the groove 41 are disposed, the address pits 42 which may not be read can be provided in advance on a non-recorded DVD-R recording medium on which no post pre-format recording information is recorded by loading the DVD-R recording medium into a DVD-R recording apparatus, in which the control section 200 controls the laser light source driving signal DLD in every designated region to increase the light amount of the light beam 44. Information representing the address of the region which may not be read is recorded in a predetermined region of the DVD-R recording medium such as in an innermost circumferential region. Then, when recording is performed for the DVD-R recording medium, the innermost circumferential region is read first to detect the region in which the address pits 42 are broken down (which region is specified, for example, from the length in a linear direction from an immediately preceding address in which the address pits 42 are not broken down). Therefore, it is possible to prevent significant post pre-format recording information into the thus detected region. If a non-recorded medium having a region which is designated, for example, using a random number and in which the address pits 42 are broken down is scattered for every DVD-R recording medium, then a laser light source of a high output power for breaking down the pre-format portion is not requisite. Therefore, the burden on the light source of a DVD-R recording apparatus which records using this non-recorded medium is light.

Second Embodiment

The address pits 42 are formed as grooves provided on the lands 43. In the first embodiment described hereinabove, the light beam 44 is disposed along the groove 41 by an action of tracking servoing. On the other hand, since the optical energy of the light beam 44 exhibits a Gaussian distribution in radial directions, in order to thermally break down an address pit 42 formed on a land 43, the entire light beam 44 has to have a high intensity. This makes a significant burden on the light source for emitting a laser beam. In other words, the efficiency is higher where the light beam 44 is irradiated directly on a land 43 than where the light beam 44 is irradiated along the groove 41. Therefore, in the present second embodiment, the light beam 44 is irradiated upon a land 43 in the following manner so that breakdown of an address pit 42 can be carried out with a smaller light amount of the light beam 44.

Particular control is performed in the following manner. First, the control section 200 performs tracking servoing along the groove 41. In this instance, the address information SAD can be read from the address pits 42. Then, immediately after an address pit 42 immediately preceding to an address pit 42 for which thermal breakdown should be performed is detected, the control section 200 changes the phase of the tracking error signal ST by 180° to obtain a tracking drive signal DT, which is outputted to the tracking actuator. As a result, the light beam 44 is irradiated upon the land 43.

In this instance, a wobble signal is obtained from both grooves adjacent the light beam 44. In particular, a wobble signal of a frequency (beat frequency) of the difference between the two wobbles. Therefore, a spindle motor control signal produced based on the wobble signal may not be used for control of the spindle motor 52, and besides it is difficult to use the wobble signal as a reference signal for detecting the position of the address pit 42. Accordingly, in this instance, a rotation signal SFG based on the speed of rotation of the spindle motor 52 is detected by means of a frequency generator 53 for detecting the speed of rotation of the spindle motor 52 or the like. Thus, the control section 200 applies a spindle motor driving signal DS based on the rotation signal SFG to the spindle motor 52 to control the spindle motor 52 so as to rotate at a speed of rotation same as that immediately before the phase of the tracking error signal ST is changed by 180°.

Then, immediately after the phase of the tracking error signal ST is changed by 180° or reversed, the laser light source driving signal DLD is controlled to further increase the light amount of the light beam 44. By this, an address pit 42 can be thermally broken down efficiently by the light beam 44 of a comparatively small light amount. In this instance, the region to be thermally broken down is set to a time length determined by the control section 200 from the rotation signal SFG and the address information SAD detected from the address pit 42 detected last. Thus, by setting the light amount of the light beam 44 to a higher value within the time length, the address pits 42 of a length corresponding to a predetermined sector length can be thermally broken down.

Then, after the address pits 42 of the length corresponding to the predetermined sector length are thermally broken down, the phase of the tracking error signal ST is changed by 180° and tracking servo is performed again along the groove 41. Thus, post pre-format recording information including the wobble signal and the address information SAD can be detected. In this instance, the light amount of the light beam 44 necessary to thermally break down the address pit 42 can be reduced when compared with that in the first embodiment.

Now, operation where information of a DVD-R recording medium for which the process described above is performed and which is used as a recording medium to be duplicated is DVD copied on another recording medium using a PC is described.

As described above, since, upon the lands 43 within a range within which the address pits 42 are broken down, the light beam 44 is irradiated in a light amount greater than that upon ordinary reproduction, the reflection factor of the organic coloring matter film at the portions of the lands 43 is low. Therefore, where tracking servoing is performed along the groove 41 in order to reproduce significant post pre-format recording information, when the light beam 44 reaches a region in which the reflection factor of the land 43 is high, the distribution of the light amount of refracted light on the photodetector 50a which is provided by the groove 41 varies by a great amount. Thus, the tracking servoing acts so as to reduce the tracking error signal ST, which is generated in response to the distribution of the light amount of the diffracted light, to zero.

As a result, also where this region is provided as an additional cell portion and has post pre-format recording information written therein, the substance of the information may not be reproduced. Then, even where it is tried to continue the reproduction operation based on the pre-format information, since the address pits 42 are broken down, it is difficult to detect even the pre-format information. As a result, the reproduction operation stops at the additional cell portion, and the control section 200 stops the DVD copying operation and signals information representing that DVD copying is difficult to an external apparatus. DVD copying can be prevented in this manner.

On the other hand, where a DVD-R recording medium recorded in such a manner as described above is reproduced on an apparatus for reproduction only, nonlinear reproduction wherein an additional cell portion which does not include significant information is skipped is carried out, and therefore, no trouble occurs with reproduction operation. Particularly, in the second embodiment, in a region wherein the reflection factor of the land portions 43 is low, the light beam 44 moves, as a result of operation of tracking servoing, so as to trace the center of the groove 41. However, in a region wherein the reflection factor of the lands 43 is low, the light beam 44 moves in a displaced relationship from the center of the groove 41. In both cases, the tracking servoing is performed along the groove 41.

Third Embodiment

In the foregoing, it is intended principally to break down the address pits 42 formed as a pre-format. In a different embodiment, it is possible to thermally break down the groove 41 and the address pits 42 or the groove 41 in some region of a DVD-R recording medium before recording of post pre-format recording information is performed or to provide no groove 41 from the first. Where the groove 41 is not provided from the first, it is possible to temporarily interrupt emission of a light beam to be irradiated to provide a groove on photoresist applied in order to fabricate a stamper at a point of time of mastering to fabricate a stamper on which a portion corresponding to the groove is lost partially and then fabricate a DVD-R recording medium using the stamper. On an inner circumferential portion of the DVD-R recording medium fabricated from the stamper, information representative of the position of the lost portion of the groove 41 is recorded as pre-format information.

Where such a DVD-R recording medium is fabricated through the mastering and stamping processes and distributed and used, the following method of use can be used. DVD-R recording media of the special specifications fabricated through the stamping process are distributed one by one or in a set of plural media only to a limited first user or users. Here, breakdown region information representing which regions of the address pits 42 are broken down is placed in a state wherein it may not be known to any other than the first user or users. In particular, a particular DVD-R recording medium of the special specifications and breakdown region information relating to the particular DVD-R recording medium are sold, for example, in a single sealed package. The confidentiality regarding the breakdown region information and information relating to the first users is imposed on the manufacturer of DVD-R recording media so that such information may not leak from the manufacturer of the DVD-R recording media. Then, the first user (copyright holder or person to which duplication right or the like is provided from the copyright holder) records information on the DVD-R recording medium and then distributes the recorded DVD-R recording medium to a second user. Further, the first user notifies the second user of information of which portion the broken down region is or software information for nonlinearly reproducing the particular DVD-R recording medium as information communicated through a different information transmission path such as information recorded on a flexible disk or encrypted Internet information. Here, the second user is a person or persons who are legally licensed to utilize the work from the copyright holder or an agent entrusted by the copyright holder. By this, the second user finally licensed from the copyright holder can receive, directly or indirectly from the copyright holder, provision of the special breakdown region information of the broken down regions or of the software to be used for nonlinear reproduction avoiding the special broken down regions. It is to be noted that, where the navigation data are set so as to avoid the broken down regions in reproduction, reproduction of images is possible even if the navigation data are not provided to the second user who receives provision of the software for linear reproduction. For example, if the software is downloaded into a PC, then nonlinear reproduction from a DVR-R medium on which desired information is recorded can be carried out. Thus, such DVD-R recording media of the special specifications fabricated in a mass by stamping can reduce the cost for fabrication thereof.

According to such a DVD-R recording medium as described above, it is possible to make short those potions in which the groove 41 and the address pits 42 or the groove 41 is lost thereby to reduce the influence on such servoing as described hereinabove. However, if the portions wherein the groove 41 is lost are made long by a mastering process to render tracking servoing difficult, then a different advantage can be anticipated. Where tracking is difficult, since not only post pre-format recording information may not be written but also pre-format information may not be obtained, DVD copying is difficult. In other words, since there is no necessity to write information different from DVD-R format information in any portion in which the groove 41 and the address pits 42 or the groove 41 is lost, also a novel LSI is not demanded.

In this instance, if significant information is written into a region immediately following a region in which the groove 41 or/and the address pits 42 do not exist, then accessing to the portion becomes difficult. Therefore, significant pre-format information for making such accessing possible or dummy information as post pre-format recording information is recorded, and then significant post pre-format recording information which contributes to actual reproduction is recorded.

Fourth Embodiment

In the first to third embodiments described above, a guide portion to be broken down by a light beam such as the groove 41, is within a range within which such breakdown does not disturb the servo functions except a case wherein a mastering process is used. In other words, the servo systems are operated suitably to selectively break down only those regions within which no problem occurs upon linear reproduction. In this manner, a region in which significant information which originally should not be broken down can be prevented from breakdown by an action of the servo systems.

However, if the groove 41 is broken down in a wider region, that is, in a case wherein an ordinary DVD recording and reproduction apparatus is used, is broken down by the recording apparatus to such a degree that some abnormality occurs with operation of the servo systems, then DVD copying becomes more difficult, The fourth embodiment is proposed from the point of view just described. In the following, the fourth embodiment is described with reference to FIGS. 10A to 10D.

FIG. 10A illustrates an interval within which post preformat recording information is recorded. Meanwhile, FIG. 10B illustrates the channel bit clock. Here, the length of the interval illustrated in FIG. 10A within which the post preformat recording information is recorded is such that a servo system of an ordinary DVD-R reproduction apparatus such as the focusing servo system or the tracking servo system, exhibits abnormal operation, and is longer than the interval illustrated in FIG. 9A. In such an instance, if the intensity of the laser light is set higher than a recording breakdown threshold value which is a boundary intensity between whether a groove is broken down or not as seen in FIG. 10C, then the groove which functions as a guide portion can be broken down continuously. FIG. 10D illustrates the intensity of the laser light upon ordinary reproduction.

Where the guide portion is broken down over a long recording interval in this manner, the operation of the servo system becomes abnormal. Therefore, in order to perform such recording, a servo function which is not provided in an ordinary DVD recording apparatus is demanded. In order to implement the function, for example, such a recording apparatus which has a configuration not shown as described below is provided.

First, the optical system uses a diffraction grating for separating a light beam from the light source into 0th order light, + first order light and − first order light and thus uses a three-spot configuration. The three light spots are disposed at different positions in a radial direction of the groove of the optical recording medium. The light spots are disposed in a spaced relationship from each other by a distance greater than the length of the groove in a radial direction corresponding to the recording interval length within which the groove is to be broken down. Further, from among the three spots, the light beam corresponding to the 0th order light is irradiated upon a photodetector similar to that used in the first to third embodiments described hereinabove. Further, in order to receive returning light of the light beam corresponding to the + first order light and the − first order light, two additional photodetectors are provided. Each of the additional photodetectors is formed as a four-element detector, and the four detector elements are disposed such that, for example, an astigmatism signal for focusing servoing and a push-pull signal for tracking servoing are obtained from signals therefrom. Further, the ratio between the light amount of the 0th order light and the light amount of the + first order light and the − first order light is different among the photodetectors. Therefore, even if such laser output power that the guide portion may be broken down is used, the astigmatism signal and the push-pull signal from the photodetectors which receive the + first order light and the − first order light are not saturated.

The DVD recording apparatus having such a configuration as described above operates in the following manner. Within an ordinary recording interval, the servo systems operate with the 0th order light. However, within the recording interval (high level) of FIG. 10A, servoing is performed based on the groove within a non-broken down portion using the + first order light or − first order light, and the position at which the 0th order light is irradiated is estimated based on address information from the non-broken down portion. Since the relative positions of the 0th order light, + first order light and − first order light are known in advance, there is no difficulty in estimation of the position at which the 0th order light is irradiated. In this manner, while the servo systems operate normally using the + first order light or − first order light, breakdown of the groove can be carried out using the 0th order light.

FIG. 10F illustrates different laser output power upon recording. In particular, "1" is normally outputted as output data within the recording interval. FIG. 10I illustrates that "0" is normally outputted as output data within the recording interval. Here, the optical system may be configured so as to use any of positive logics and negative logics for the recording signal WDT. The laser output powers upon recording illustrated in FIGS. 10G and 10J are same as each other. Meanwhile, FIGS. 10H and 10K illustrate laser output powers upon reproduction.

Modifications to the Embodiments

In the embodiments described above, a DVD-R recording medium is used. However, in a modification to the embodiments described above, for example, the DVD-RW, DVD+R, DVD+RW and DVD-RAM can be used as a recording format in recording on an optical recording medium. Further, the recording format is not limited to DVD formats, but may be modified to any other format including the CD-R format.

Further, the guide portion of a pre-format for guiding a light beam is not limited to a guide portion formed as a groove, but may be formed similarly as pits. Further, the address part for specifying the position of the guide portion may be formed not only as a pit disposed on a land but may be used commonly together with the address part such that the address is represented by the length of the pits. Or, the wobbled groove may not be formed so as to have a fixed period, but may be formed so as to have a varying period to represent address information.

Further, the recording film on which post pre-format recording information is to be written may be formed from organic coloring matter but may be formed as an alloy layer which is converted into an amorphous layer by heat so as to vary the reflection factor or else as a phase change film. Further, the recording film may be formed as a photo-magnetic film while an optical system which detects a Kerr rotational angle is used as the optical system.

While preferred embodiments of the present invention have been described using specific terms, such description is for illustrative purpose only, and it is to be understood that changes and variations may be made without departing from the spirit or scope of the following claims.

The invention claimed is:

1. An optical recording apparatus which records post preformat recording information on an optical recording medium which has a guide portion formed in advance for guiding a light beam and a plurality of address portions for specifying individual positions of the guide portion, comprising:

position information detection means for detecting position information of a recording region in which significant information is recorded along the guide portion and a breakdown region which is part of the guide portion or/and the address portions and is broken down so address information specifying individual positions of the guide portion included as pre-format information in the breakdown region cannot be detected using the light beam;

servo means for controlling the position of the light beam based on the position information; and laser light intensity adjustment means for adjusting the intensity of the light beam in order to record information based on a predetermined format in the recording region and thermally break down the breakdown region such that the address information specifying the individual positions of the guide portion included as the pre-format information in the breakdown region cannot be detected using the light beam.

2. The optical recording apparatus according to claim 1, wherein a pattern which does not exist in the predetermined format is recorded as the post pre-format recording information in a region including the breakdown region.

3. The optical recording apparatus according to claim 2, further comprising random number generation means for generating a random number, the pattern which does not exist in the predetermined format being in a form modulated based on the random number generated by said random number generation means.

4. The optical recording apparatus according to claim 1, wherein each of the address portions is thermally broken down by focusing the light beam at the address portion which is one of the breakdown regions and disposed between different portions of the guide portion, and the light beam is focused at the guide portion to record the significant information along the guide portion.

5. The optical recording apparatus according to claim 1, wherein the guide portion is thermally broken down over a length of an interval over which it is difficult for the light beam to trace the guide portion.

6. The optical recording apparatus according to claim 1, wherein said laser intensity adjustment section raises, in the breakdown region, the intensity of the laser beam so as to thermally break down the guide portion or the address portions.

7. The optical recording apparatus according to claim 1, wherein said servo means controls rotation of a spindle motor to low speed rotation so that the breakdown region can be thermally broken down.

8. An optical recording method for an optical recording medium which has a guide portion formed in advance for guiding a light beam and a plurality of address portions for specifying individual positions of the guide portion, comprising:

detecting position information of a recording region in which significant information is recorded along the guide portion and a breakdown region which is part of the guide portion or/and the address portions and is broken down so address information specifying individual positions of the guide portion included as pre-format information in the breakdown region cannot be detected using the light beam;

controlling the position of the light beam based on the position information;

emitting the light beam having an optical intensity with which information based on a predetermined format can be recorded in the recording region; and emitting the light beam having an optical intensity with which the breakdown region can be thermally broken down such that the address information specifying individual positions of the guide portion included as pre-format information in the breakdown region cannot be detected using the light beam.

9. An optical recording medium which has a guide portion formed in advance for guiding a light beam and a plurality of address portions for specifying individual positions of the guide portion, comprising:

a region in which the guide portion for guiding the light beam for recording significant information and a plurality of address portions for specifying individual positions of the guide portion are disposed; and another region in which any of the guide portion or/and the address portions is to be thermally broken down to form a breakdown region having a predetermined reproduction characteristic such that address information specifying individual positions of the guide portion included as pre-format information in the breakdown region formed from the any of the guide portion or/and the address portions cannot be detected using the light beam.

10. The optical recording medium according to claim 9, wherein position information for specifying the breakdown region in which any of the guide portion or/and the address portions is to be thermally broken down to have the predetermined reproduction characteristic is recorded in a predetermined region of the optical recording medium.

11. An optical recording apparatus which records post pre-format recording information on an optical recording medium which has a guide portion formed in advance for guiding a light beam and a plurality of address portions for specifying individual positions of the guide portion, comprising:

a position information detection section configured to detect position information of a recording region in which significant information is recorded along the guide portion and a breakdown region which is part of the guide portion or/and the address portions and is broken down so address information specifying individual positions of the guide portion included as pre-format information in the breakdown region cannot be detected using the light beam;

a servo section configured to control the position of the light beam based on the position information; and a laser light intensity adjustment section configured to adjust the intensity of the light beam in order to record information based on a predetermined format in the recording region and thermally break down the breakdown region such that the address information specifying the individual positions of the guide portion included as the pre-format information in the breakdown region cannot be detected using the light beam.

* * * * *